US007778276B2

(12) United States Patent
Hamazaki

(10) Patent No.: US 7,778,276 B2
(45) Date of Patent: Aug. 17, 2010

(54) MOBILE COMMUNICATION TERMINAL, MOBILE COMMUNICATION METHOD, AND INFORMATION RECORDING MEDIUM

(75) Inventor: Kenichi Hamazaki, Yokohama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 584 days.

(21) Appl. No.: 11/713,915

(22) Filed: Mar. 5, 2007

(65) Prior Publication Data

US 2007/0223535 A1 Sep. 27, 2007

(30) Foreign Application Priority Data

Mar. 23, 2006 (JP) ............................. 2006-080540

(51) Int. Cl.
*H04J 3/24* (2006.01)
*H04L 12/56* (2006.01)

(52) U.S. Cl. ........................ 370/473; 370/394; 714/749

(58) Field of Classification Search ................. 370/242, 370/252, 328, 389, 394, 412, 428, 464, 473, 370/516; 455/69, 450, 458, 524, 525; 714/701, 714/712, 749–755; 725/114, 116, 144, 146
See application file for complete search history.

(56) References Cited

U.S. PATENT DOCUMENTS 6,799,294 B1 * 9/2004 Chung et al. ................ 714/786
7,131,048 B2 * 10/2006 Suzuki et al. ............... 714/748
2002/0018468 A1 * 2/2002 Nishihara ................... 370/389
2004/0008631 A1 * 1/2004 Kim ........................... 370/242
2004/0136377 A1 * 7/2004 Miyazaki et al. ............ 370/394
2004/0248579 A1 * 12/2004 Fukui et al. ................. 455/450
2005/0044471 A1 * 2/2005 Chia et al. .................. 714/776
2005/0111371 A1 * 5/2005 Miura et al. ................ 370/242
2005/0276249 A1 * 12/2005 Damnjanovic et al. ...... 370/335
2006/0007881 A1 * 1/2006 Kondo ........................ 370/328
2007/0226577 A1 * 9/2007 Lee ............................ 714/751

FOREIGN PATENT DOCUMENTS

JP 2000-324161 11/2000
JP EP 1077553 * 2/2001
JP 2001-298725 10/2001
JP 2002-232478 8/2002
JP 2004-112076 4/2004

* cited by examiner

*Primary Examiner*—Aung S Moe
*Assistant Examiner*—Prince Mensah
(74) *Attorney, Agent, or Firm*—Cohen Pontani Lieberman & Pavane LLP

(57) ABSTRACT

A mobile communication terminal receives and reproduces a television broadcast from a broadcasting device, and determines any error in the packets making up the received stream data. Based on the continuity of determined error packets, the mobile communication terminal groups the packets to determine the packets for which a retransmission request is to be made. When a user instructs complementary reproduction, the mobile communication terminal sends information indicating the designated packet group to a distribution device through a mobile communication network to request packet retransmission. The distribution device transmits the packets included in the packet group to the mobile communication terminal. When receiving stream data transmitted from the distribution device through the mobile communication network, the mobile communication terminal reproduces the received retransmitted stream data at higher bit rate than normal reproduction rate. When the reproduction catches up with the present broadcast, the present broadcast is reproduced on time.

16 Claims, 16 Drawing Sheets

170 RECEIVED PACKET MANAGING TABLE 171 172

| CONTINUITY COUNTER | RECEPTION FLAG | | |
|---|---|---|---|
| | VIDEO (PID11) | AUDIO (PID12) | TEXT (PID13) |
| 1 | 1 | 1 | 1 |
| 2 | 1 | | 1 |
| 3 | | 1 | 1 |
| 4 | | | |
| 5 | | | 1 |
| 6 | 1 | | |
| 7 | 1 | 1 | |
| 8 | | 1 | |
| 9 | 1 | | 1 |
| 10 | | 1 | 1 |
| 11 | 1 | | |
| 12 | | | |
| 13 | 1 | 1 | 1 |
| 14 | 1 | 1 | 1 |
| 15 | | 1 | |
| 16 | 1 | | 1 |
| 17 | | 1 | |
| 18 | | | |
| 19 | 1 | 1 | 1 |
| 20 | 1 | 1 | 1 |
| 21 | 1 | 1 | 1 |
| ⋮ | ⋮ | ⋮ | ⋮ |

FIG.3

180 ERROR PACKET MANAGING TABLE

FIG.4A

| RECORD | ERROR PACKET (PID, CONTINUITY COUNTER) | | |
|---|---|---|---|
| | VIDEO | AUDIO | TEXT |
| 1 | (11, 3) | (12, 2) | (13, 4) |
| 2 | (11, 4) | (12, 4) | (13, 6) |
| 3 | (11, 5) | (12, 5) | (13, 7) |
| 4 | (11, 8) | (12, 6) | (13, 8) |
| 5 | (11, 10) | (12, 9) | (13, 10) |
| 6 | (11, 12) | (12, 11) | (13, 12) |
| 7 | (11, 15) | (12, 12) | (13, 15) |
| 8 | (11, 17) | (12, 16) | (13, 17) |
| 9 | (11, 18) | (12, 18) | (13, 18) |
| ⋮ | ⋮ | ⋮ | ⋮ |

190 REQUEST PACKET MANAGING TABLE

| VIDEO | | AUDIO | | TEXT | |
|---|---|---|---|---|---|
| GROUP | REQUEST PACKET (PID, CONTINUITY COUNTER) | GROUP | REQUEST PACKET (PID, CONTINUITY COUNTER) | GROUP | REQUEST PACKET (PID, CONTINUITY COUNTER) |
| 1 | (11, 3) | 1 | (12, 2) | 1 | (13, 4) |
| | (11, 4) | | (12, 3) | | (13, 5) |
| | (11, 5) | | (12, 4) | | (13, 6) |
| 2 | (11, 8) | | (12, 5) | | (13, 7) |
| | (11, 9) | | (12, 6) | | (13, 8) |
| | (11, 10) | 2 | (12, 9) | 2 | (13, 11) |
| | (11, 11) | | (12, 10) | | (13, 12) |
| | (11, 12) | | (12, 11) | 3 | (13, 15) |
| 3 | (11, 15) | | (12, 12) | | (13, 16) |
| | (11, 16) | 3 | (12, 16) | | (13, 17) |
| | (11, 17) | | (12, 17) | | (13, 18) |
| | (11, 18) | | (12, 18) | ⋮ | ⋮ |
| ⋮ | ⋮ | ⋮ | ⋮ | | |

FIG.4B

170

171 173

| RECEIVED ORDER | TS PACKET TYPE | PID | CONTINUITY COUNTER | | | ERROR FLAG |
|---|---|---|---|---|---|---|
| | | | VIDEO | AUDIO | TEXT | |
| 1 | NIT | 0 | | | | 0 |
| 2 | VIDEO | 11 | 1 | | | 1 |
| 3 | AUDIO | 12 | | 1 | | 0 |
| 4 | PMT | 10 | | | | 0 |
| 5 | TEXT | 13 | | | 1 | 1 |
| 6 | VIDEO | 11 | 2 | | | 1 |
| 7 | VIDEO | 11 | 3 | | | 0 |
| 8 | AUDIO | 12 | | 2 | | 1 |
| 9 | TEXT | 13 | | | 2 | 0 |
| 10 | AUDIO | 12 | | 3 | | 1 |
| 11 | VIDEO | 11 | 4 | | | 0 |
| 12 | VIDEO | 11 | 5 | | | 1 |
| 13 | TEXT | 13 | | | 3 | 1 |
| 14 | AUDIO | 12 | | 4 | | 0 |
| 15 | AUDIO | 12 | | 5 | | 0 |
| 16 | VIDEO | 11 | 6 | | | 0 |
| 17 | AUDIO | 12 | | 6 | | 1 |
| 18 | VIDEO | 11 | 7 | | | 1 |
| 19 | VIDEO | 11 | 8 | | | 1 |
| 20 | TEXT | 13 | | | 4 | 0 |
| 21 | VIDEO | 11 | 9 | | | 0 |
| ⋮ | ⋮ | ⋮ | ⋮ | ⋮ | ⋮ | ⋮ |

FIG.12

MOBILE COMMUNICATION TERMINAL, MOBILE COMMUNICATION METHOD, AND INFORMATION RECORDING MEDIUM

BACKGROUND OF THE INVENTION

1. Field of the Invention

The present invention relates to a mobile communication terminal suitable for watching television thereon, and a mobile communication method and an information recording medium which make a mobile communication terminal suitable for watching television thereon.

2. Description of the Related Art

Recently, mobile communication terminals equipped with a function for receiving television programs broadcasted by digital terrestrial broadcasting have become popular. As television broadcasting for mobile communication terminals such as portable telephones, etc., particularly, digital broadcasting according to standards like ISDB-T (Integrated Services Digital Broadcasting-Terrestrial), DVB-H (Digital Video Broadcasting-Handheld), T-DMB (Terrestrial-Digital Media Broadcasting), etc. has been started, providing users with increasing opportunities for watching television broadcasts by using mobile communication terminals.

Such television broadcast reception by a mobile communication terminal has a merit that television broadcasts can be received while on the move. On the other hand, there is a demerit that it is hard to maintain a fine reception condition, because the reception condition changes due to the moves. That is, unlike a stationary television receiver, etc., a mobile communication terminal cannot sometime allow fine viewing, due to various factors such as fluctuations (fading) of the intensity of the received waves due to the moves, fluctuations of the intensity of the received waves due to geographical changes, multipath caused by reflections on the surrounding constructions, etc.

A mobile communication terminal has a function for data communication through a communication network, as its basic function. A method for solving the above-described problem, which involves the use of such a communication function, has been proposed. For example, Unexamined Japanese Patent Application KOKAI Publication No. 2001-298725 discloses a system in which, when a broadcast reception error occurs in a mobile communication terminal, a server connected to a communication network retransmits the packet data corresponding to the error portion in a predetermined block unit to complement the reception error and enable continued viewing.

However, according to the above-described conventional method, even in a case where there is only one error packet in a given block, the server retransmits the packet in the predetermined block unit, resulting in a poor communication efficiency. Further, in a case where a terminal requests the server to retransmit only error packets, the terminal might have to frequently make requests for the retransmission of the packets and frequently receive the packets, depending on the reception condition, also resulting in a poor communication efficiency. That is, since none of these methods can achieve a fine communication efficiency, it is difficult to obtain smooth reproduction with simultaneous complementing of error packets.

SUMMARY OF THE INVENTION

The present invention was made in view of the above-described circumstance, and an object of the present invention is to provide a mobile communication terminal suitable for efficient complementary reproduction, etc.

To achieve the above object, a mobile communication terminal according to a first aspect of the present invention comprises:

a broadcast receiving unit which receives stream data of a television broadcast program;

an error packet determining unit which determines whether or not each packet that makes up the stream data received by the broadcast receiving unit has been received properly;

an error packet requesting unit which determines a packet which should be acquired from a distribution device that distributes same stream data as the stream data of the television broadcast program based on information included in each packet and indicating an order of reproducing each packet and a determination result of the error packet determining unit, and requests the distribution device to distribute the determined packet;

a request packet receiving unit which receives the packet requested by the error packet requesting unit, from the distribution device; and a reproducing unit which reproduces the stream data received by the broadcast receiving unit or stream data including the packet received by the request packet receiving unit.

In a case where error packets determined by the error packet determining unit as not having been received properly have numbers that indicate the order of reproducing and that are continuous to each other, the error packet requesting unit may request the distribution device to distribute these error packets.

In a case where error packets determined by the error packet determining unit as not having been received properly have numbers that indicate the order of reproducing and that are not separated from each other by a predetermined number or larger, the error packet requesting unit may request the distribution device to distribute these error packets and a packet whose order of reproducing is between these error packets and which has been received properly.

The error packet requesting unit may request the distribution device to distribute the packet, in response to an operation of a user of the mobile communication terminal.

The error packet requesting unit may request the distribution device to distribute a packet, which has been received by the broadcast receiving unit at a time which is before a timing at which the operation of the user is given by a predetermined time period.

The reproducing unit may reproduce the stream data including the packet received by the request packet receiving unit, at a speed higher than a normal reproduction speed for the stream data received by the broadcast receiving unit.

The mobile communication terminal may further comprise a storage unit which stores the stream data received by the broadcast receiving unit, and the broadcast receiving unit may receive the stream data of the television broadcast program and store the received stream data in the storage unit, while the reproducing unit reproduces the stream data including the packet received by the request packet receiving unit.

After completing reproducing the stream data including the packet received by the request packet receiving unit, the reproducing unit may reproduce the stream data stored in the storage unit at the speed higher than the normal reproduction speed.

The reproducing unit may determine whether or not the reproducing of the stream data stored in the storage unit has caught up with a television broadcast presently being broadcast, and in a case where it is determined that the reproducing of the stream data stored in the storage unit has caught up with the television broadcast presently being broadcast, may reproduce stream data of the television broadcast presently being broadcast and received by the broadcast receiving unit.

The mobile communication terminal may further comprise a reception unit which receives an instruction that the reproducing of the stream data stored in the storage unit should be ended from a user, and in a case where the reception unit receives an instruction that the reproducing of the stream data stored in the storage unit should be ended, after the reproducing of the stream data including the packet received by the request packet receiving unit is completed, the reproducing unit may reproduce stream data of a television broadcast presently being broadcast.

In a case where a packet error rate of a packet making up the stream data received by the broadcast receiving unit is equal to or larger than a predetermined threshold, the error packet requesting unit may request the distribution device to distribute the packet.

In a case where a packet error rate of a packet making up the stream data received by the broadcast receiving unit is equal to or larger than a predetermined threshold, the error packet requesting unit may give the user a notification, which prompts the user to instruct reception of the packet by the request packet receiving unit.

In a case where a packet error rate of a packet making up the stream data received by the broadcast receiving unit is equal to or larger than a predetermined threshold, the error packet requesting unit may receive an instruction input indicating whether or not to request the distribution device to distribute the packet, from the user.

In a case where the packet error rate is smaller than the predetermined threshold, the error packet requesting unit may refrain from receiving the instruction input from the user.

A mobile communication method according to a second aspect of the present invention comprises:

a first receiving step of receiving stream data of a television broadcast program;

an error packet determining step of determining whether or not each packet making up the stream data received at the first receiving step has been received properly;

a second receiving step of determining a packet which should be received, based on information included in each packet and indicating an order of reproducing each packet and a determination result at the error packet determining step, and receiving the determined packet from outside; and a reproducing step of reproducing the stream data received at the first receiving step or stream data including the packet received at the second receiving step.

A computer-readable information recording medium according to a third aspect of the present invention stores a program for controlling a computer to function as:

a broadcast receiving unit which receives stream data of a television broadcast program;

an error packet determining unit which determines whether or not each packet making up the stream data received by the broadcast receiving unit has been received properly;

an error packet requesting unit which determines a packet which should be acquired from a distribution device that distributes same stream data as the stream data of the television broadcast program based on information included in each packet and indicating an order of reproducing each packet and a determination result of the error packet determining unit, and requests the distribution device to distribute the determined packet;

a request packet receiving unit which receives the packet requested by the error packet requesting unit, from the distribution device; and a reproducing unit which reproduces the stream data received by the broadcast receiving unit or stream data including the packet received by the request packet receiving unit.

According to the present invention, since a retransmission request is made based on the continuity of the error packets, it is possible to perform reproduction while performing efficient complementing.

BRIEF DESCRIPTION OF THE DRAWINGS

These objects and other objects and advantages of the present invention will become more apparent upon reading of the following detailed description and the accompanying drawings in which:

FIG. 3 is a diagram showing an example of a received packet managing table stored in a received packet storage area;

FIG. 4A shows an example of an error packet managing table stored in an error information storage area and FIG. 4B shows an example of a request packet managing table stored in a request information storage area;

FIG. 12 is a diagram showing an example of a received packet managing table according to embodiment 2 of the present invention;

DETAILED DESCRIPTION OF THE PREFERRED EMBODIMENTS

Embodiment 1

Figure 1:
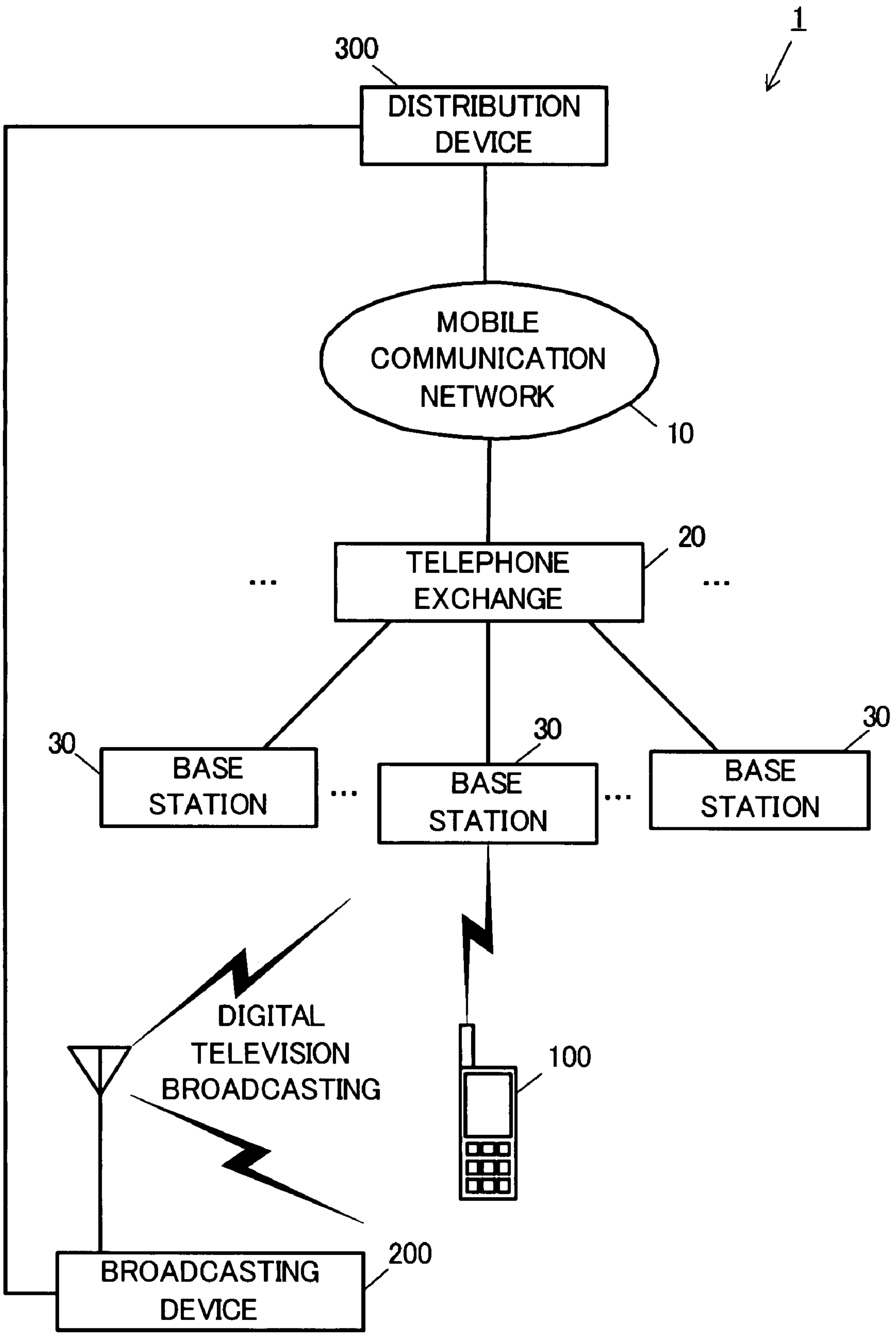
FIG. 1 is a diagram showing the configuration of a broadcast reception system according to an embodiment of the present invention.

An embodiment of the present invention will be explained below with reference to the drawings. First, a television reception system according to the present embodiment will be explained with reference to FIG. 1. FIG. 1 is a diagram exemplarily showing the configuration of the television reception system 1.

The television reception system 1 according to the present embodiment is a system in which a user receives television broadcasts with the use of a mobile communication terminal 100. As shown in FIG. 1, the television reception system 1 comprises a mobile communication network 10, telephone exchanges 20, base stations 30, a broadcasting device 200, and a distribution device 300.

The mobile communication network 10 is a network that realizes the so-called cellular communication provided by a mobile communication carrier. A plurality of telephone exchanges 20 are connected to the mobile communication network 10. A plurality of base stations 30 are connected to each telephone exchange 20. By wirelessly communicating with a nearby base station 30, the mobile communication terminal 100 can make calls or perform data communications through the mobile communication network 10.

The mobile communication terminal 100 according to the present embodiment has a function for receiving television programs. Television programs to be received by the mobile communication terminal 100 are broadcast from the broadcasting device 200. According to the present embodiment, content data representing a television program, etc. is broadcast from the broadcasting device 200, according to digital television broadcasting for portable terminals (so-called one-segment broadcasting) under ISDB-T standard, which is one of the manners of digital television broadcasting for mobile terminals. The broadcasting device 200 of the present embodiment is a device for broadcasting televisions on digital terrestrial television broadcast waves. The standard for digital terrestrial broadcasting is not limited to the above, but may be any other standard like DVB-H, T-DMB, etc. Further, digital satellite broadcasting for broadcasting televisions by an unillustrated communication satellite may be utilized. Further, not digital television broadcasting, but digital radio broadcasting may be utilized.

The distribution device 300 is connected to the mobile communication network 10, and distributes the same content as the television program broadcast by the broadcasting device 200 to the mobile communication terminal 100 through the mobile communication network 10, in order to complement the television broadcast reception by the mobile communication terminal 100. According to the present embodiment, the distribution device 300 distributes packet data to each mobile communication terminal 100, in response to a request from that mobile communication terminal 100 for that packet data.

Each element of the television reception system 1 will be explained below in more detail. First, the mobile communication terminal 100 according to the present embodiment will be explained. The mobile communication terminal 100 is a terminal device for mobile communication, such as, for example, a portable telephone, a PHS (Personal Handyphone System), etc.

The mobile communication terminal 100 can perform bi-directional communications such as phone calls, data communications, etc., through the mobile communication network 10. Further, the mobile communication terminal 100 can receive and reproduce a television program broadcast by the broadcasting device 200 as described above. According to the present embodiment, the television program receiving function of the mobile communication terminal 100 is realized by the broadcasting by the broadcasting device 200 and the communication by the distribution device 300. To be more specific, the mobile communication terminal 100 has (1) a function for receiving a digital broadcast for portable terminal according to the ISDB-T standard as one manner of digital terrestrial television broadcasting from the broadcasting device 200 and reproducing it (hereinafter referred to as "broadcast program receiving function"), and (2) a function for receiving moving image data (streaming data) distributed from the distribution device 300 through the mobile communication network 10 and reproducing it (hereinafter referred to as "distributed program receiving function").

Figure 2:
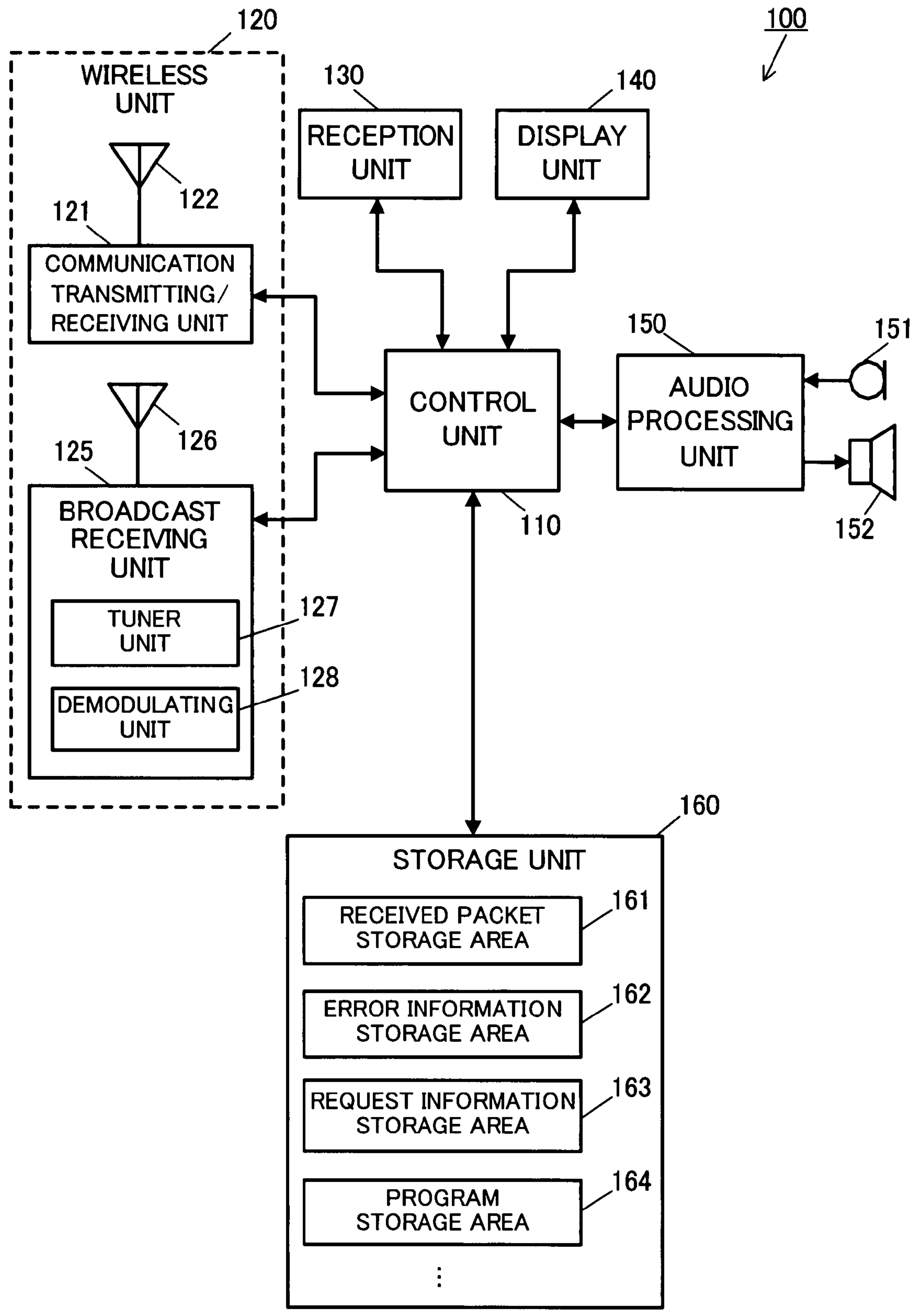
FIG. 2 is a block diagram showing the configuration of a mobile communication terminal according to an embodiment of the present invention.

The configuration of the mobile communication terminal 100 according to the present embodiment will be explained with reference to FIG. 2. FIG. 2 is a block diagram showing the configuration of the mobile communication terminal 100.

As shown, the mobile communication terminal 100 comprises a control unit 110, a wireless unit 120, a reception unit 130, a display unit 140, an audio processing unit 150, and a storage unit 160.

The control unit 110 comprises, for example, a CPU (Central Processing Unit), a RAM (Random Access Memory) functioning as a work area, and a ROM (Read Only Memory). The control unit 110 controls each unit of the mobile communication terminal 100 by executing predetermined operation programs stored in the ROM and the storage unit 160. That is, each element of the mobile communication terminal 100 is controlled by the control unit 110 and information transmission, etc. between the elements is performed through the control unit 110.

The wireless unit 120 transmits or receives data by wireless communication, and receives digital television broadcasts. The wireless unit 120 comprises a communication transmitting/receiving unit 121 and a broadcast receiving unit 125.

The communication transmitting/receiving unit 121 is constituted by a communication device or the like, which employs a communication system such as the CDMA (Code Division Multiple Access) system, and performs wireless communication with a nearby base station 30, through wireless transmission and reception through an antenna 122 adapted to such a communication system. That is, by the control unit 110 controlling the communication transmitting/receiving unit 121, the mobile communication terminal 100 can wirelessly access the mobile communication network 10. By this wireless access, the mobile communication terminal 100 can make phone calls or perform data communications including the distributed program reception.

The broadcast receiving unit 125 is constituted by, for example, a receiving device for digital terrestrial broadcasting, and receives radio waves of television broadcasts radiated from the broadcasting device 200. The broadcast receiving unit 125 includes a tuner unit 127, a demodulating unit 128, etc. as shown in FIG. 2. The broadcast receiving unit 125 performs channel tuning, demodulating, etc. for airwaves received by a television broadcast receiving antenna 126.

The antenna 126 receives an airwave, which carries a transport stream packet (hereinafter referred to as "TS packet"), making up content data (video data, audio data, text data, etc.) and modulated according to the OFDM (Orthogonal Frequency Division Multiplexing) method, and inputs the received airwave to the broadcast receiving unit 125. A TS packet is packet data having a fixed length.

The tuner unit 127 is constituted by a wave filter circuit such as, for example, a BPF (Band Path Filter), and picks out only a signal wave (desired wave) of the selected channel, from airwaves received by the antenna 126.

The demodulating unit 128 comprises, for example, an ADC (Analog-Digital Converter), an FFT (Fast Fourier Transform) circuit, a decoding circuit, etc., and demodulates the OFDM signal of the desired wave picked out by the tuner unit 127 by converting it into a digital signal.

The reception unit 130 is constituted by an input device such as buttons and keys arranged on the external surface of the mobile communication terminal 100, and operated by the user of the mobile communication terminal 100. The reception unit 130 comprises an input circuit or the like which is connected to the buttons and keys, to generate an input signal corresponding to an operation of the user and input it to the control unit 110. According to the present embodiment, for example, an instruction for activating a television watching function, an instruction for selecting a broadcasting channel, etc. are given with the use of the reception unit 130.

The display unit 140 comprises an output device such as, for example, a liquid crystal display device, etc., and displays a moving image, a still image, etc., under the control of the control unit 110. According to the present embodiment, the display unit 140 displays moving images of a television program received by the broadcast receiving unit 125, etc.

The audio processing unit 150 is constituted by, for example, an audio data codec circuit, etc., and performs processes relating to audio output by the mobile communication terminal 100. That is, the audio processing unit 150 converts the voices uttered by the user input from a microphone 151 into digital audio data, and sends it to the communication transmitting/receiving unit 121. Further, the audio processing unit 150 converts digital audio data received by the communication transmitting/receiving unit 121 into an analog audio signal and outputs it from a speaker 152. Other than this, according to the present embodiment, the audio processing unit 150 converts audio data of a television program received by the communication transmitting/receiving unit 121 and the broadcast receiving unit 125 into an analog audio signal and outputs it from the speaker 152.

The storage unit 160 is constituted by, for example, a storage device such as a flash memory, etc., and stores various data such as an operation program to be executed by the control unit 110. As shown in FIG. 2, the storage unit 160 comprises storage areas such as a received packet storage area 161, an error information storage area 162, a request information storage area 163, a program storage area 164, etc.

Figure 6:
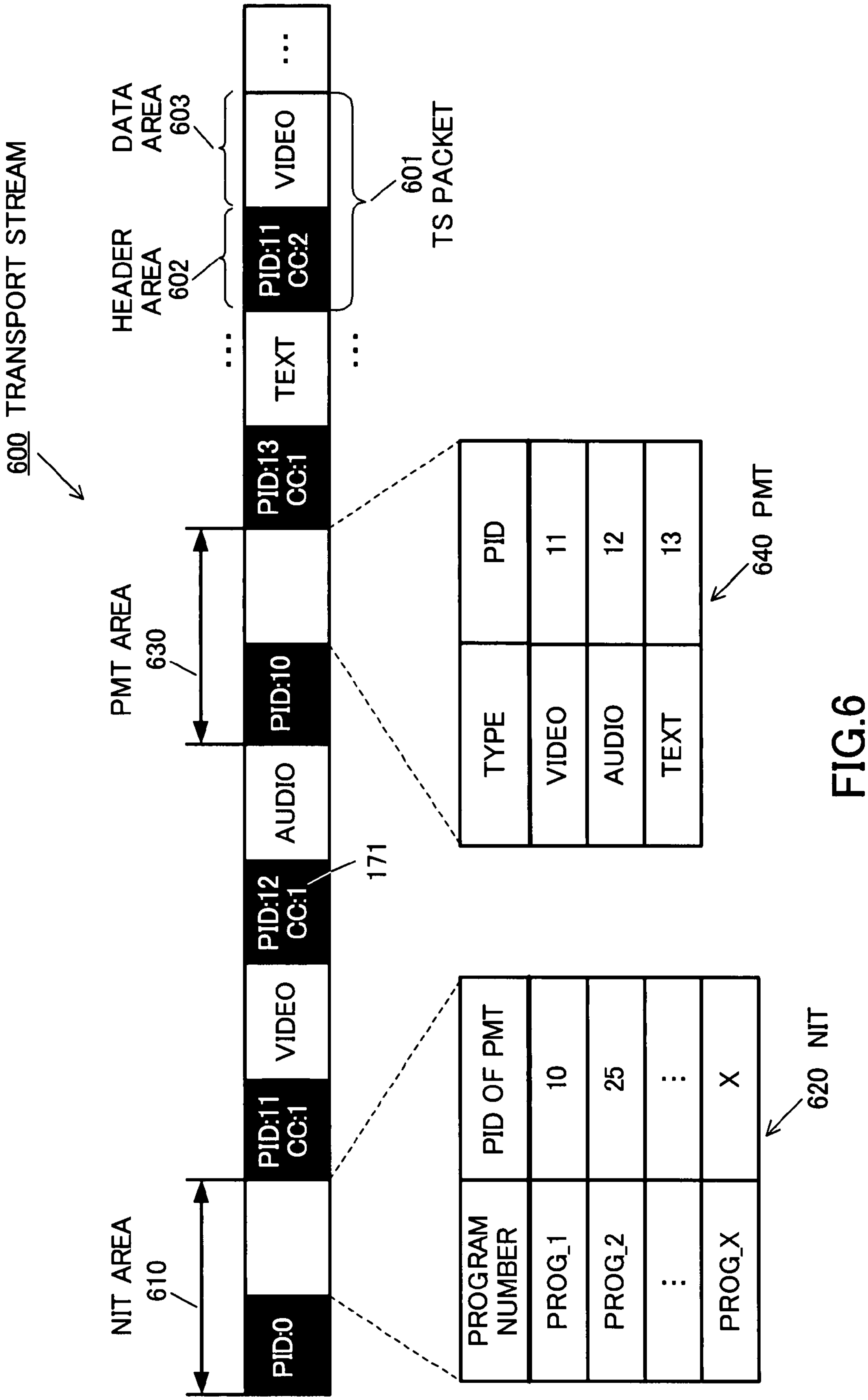
FIG. 6 is a diagram for explaining the structure of a transport stream received by the mobile communication terminal.

The received packet storage area 161 stores TS packets received by the broadcast receiving unit 125. A TS packet is packet data of video data, audio data, additional data, etc. which are multiplexed in a transport stream format prescribed by the MPEG-2 (Moving Picture Experts Group phase 2) system (ISO/IEC 13818-1). An example of the structure of a transport stream 600 made up of such TS packets will be explained with reference to FIG. 6. Note that FIG. 6 is merely one example.

As shown, a transport stream 600 included in a broadcast wave received by the broadcast receiving unit 125 typically comprises a plurality of TS packets 601. A TS packet 601 includes a header area 602 and a data area 603. A PID (Packet Identifier) for identifying each TS packet 601 is written in the header area 602 of each TS packet 601. In the digital television broadcasting according to the ISDB-T standard, a plurality of programs can be transmitted through only one physical channel by multiplexing. The transport stream 600 includes a NIT area 610 for storing table information representing information on the lineup of the programs. Under the ISDB-T standard, table information called NIT (Network Information table) 620 is stored in this NIT area 610. A specific PID ("0" according to the present embodiment) is assigned to the packet that corresponds to the NIT area 610.

In this NIT 620, information for specifying a PMT (Program Map Table) 640, which designates packet data making up each program, is written. For example, in a case where X (X being an integer equal to or larger than 1) programs (Prog_1 to Prog_X) are multiplexed on one transport stream 600, PIDs indicating PMTs 640 corresponding to the respective programs are written in the NIT 620, as shown in FIG. 6. The TS packet 601 includes a PMT area 630 for storing the PMT 640.

Typically, the transport stream 600 of one television broadcast program is made up of elements such as video data, audio data, text data (caption), etc. Each element is constituted by a unit called ES (Elementary Stream) packet. In the PMT 640, PIDs for identifying ES packets are written. In the example shown in FIG. 6, for example, the IT 620 indicates that the PMT 640 of the program whose program number is Prog_1 is the packet whose PID is "10". The PMT 640, which is stored in the packet whose PID is 10, stores information indicating that a packet whose PID is "11" is an ES packet of video data making up the program Prog_1, a packet whose PID is "12" is an ES packet of audio data making up the program Prog_1, and a packet whose PID is "13" is an ES packet of text data making up the program Prog_1.

That is, when content data included in the ES packets whose PID is "11", among the packets multiplexed on the transport stream 600, are extracted and joined to each other, the video stream of the program Prog_1 is obtained. When content data included in the ES packets whose PID is "12" are extracted and joined to each other, the audio stream of the program Prog_1 is obtained. When content data included in the ES packets whose PID is "13" are extracted and joined to each other, the data broadcasting stream of the program Prog_1 is obtained. A continuity counter (CC) 171 is information that indicates the order of joining these ES packets, and written in the header area 602 of each ES packet. The continuity counter 171 is set as a serial integer starting from 1, and indicates, element-type by element-type, the order in which content data included in each ES packet is joined to other content data. The continuity counter 171 may not only be an integer, but may be an arbitrary number, character, symbol, etc., as long as the order of joining the content data included in each ES packet can be known.

The received packet storage area 161 stores packet data separated from the transport stream 600 having such a structure. Further, the received packet storage area 161 stores a received packet managing table 170 for managing the reception condition of the packet data. The received packet managing table 170 is generated by the control unit 110. An example of information recorded on this received packet managing table 170 is shown in FIG. 3.

As shown, a record is generated for each value of the continuity counter 171 in the received packet managing table 170, and a reception flag 172 indicating whether the ES packet assigned a corresponding continuity counter value has been received or not is recorded, ES-packet-type by ES-packet-type. In a case where a corresponding ES packet has already been received, "1" is set to the flag value of the reception flag 172. Note that an embodiment where the value setting of the reception flag 172 is changed arbitrarily may be employed.

The continuity counter 171 affixed to each ES packet is information indicating the order of joining the content data included in the ES packet, or the order of reproducing the content data included in the ES packet. In other words, the continuity counter 171 indicates the continuity of the ES packet. Therefore, by checking the continuity counter 171 of a received ES packet, it is possible to determine any packet that has dropped out due to reception error, etc. That is, in the received packet managing table 170, any packet whose reception flag 172 is not "1" is a packet (hereinafter referred to as "error packet") that has not yet received or has ended up in reception failure.

Then, an error packet managing table 180 for managing such an error packet is stored in the error information storage unit 162. The error packet managing table 180 is generated by the control unit 110. An example of information recorded on the error packet managing table 180 is shown in FIG. 4A. As shown, the PID and continuity counter value of each ES packet whose reception flag 172 is not "1" in the received packet managing table 170 are extracted and recorded in the error packet managing table 180, ES-packet-type by ES-packet-type.

A request packet managing table 190 for managing a packet for which a retransmission request is to be made is stored in the request information storage area 163, based on such an error packet managing table 180. The request packet managing table 190 is generated by the control unit 110. An example of information recorded on the request packet managing table 190 is shown in FIG. 4B. As shown, the PID and continuity counter value of an ES packet which the control unit 110 requests the distribution device 300 to retransmit are recorded ES-packet-type by ES-packet-type.

The control unit 110 requests the retransmission in a group unit, which includes not only the error packet (the packet that has not been received properly), but also a normal packets (a packet that has been received properly) prior or posterior to the error packet. According to the present embodiment, for example, in a case where adjoining packets are both error packets and in a case where a given error packet and the next error packet are not separated from each other by two packets or more, these are made up as one group. In a case where any normal packet exists between the error packets which are at the starting end and finishing end of a group, the retransmission request is made inclusive of that normal packet. That is, the packets which are to be requested for retransmission are designated based on the continuity of the error packet. The details will be described later.

The program storage area 164 is an area for storing programs executed by the control unit 110. The program storage area 164 stores basic software (so-called OS) for controlling the operations of the entire mobile communication terminal 100, application software for realizing various functions of the mobile communication terminal 100, etc.

Figure 5:
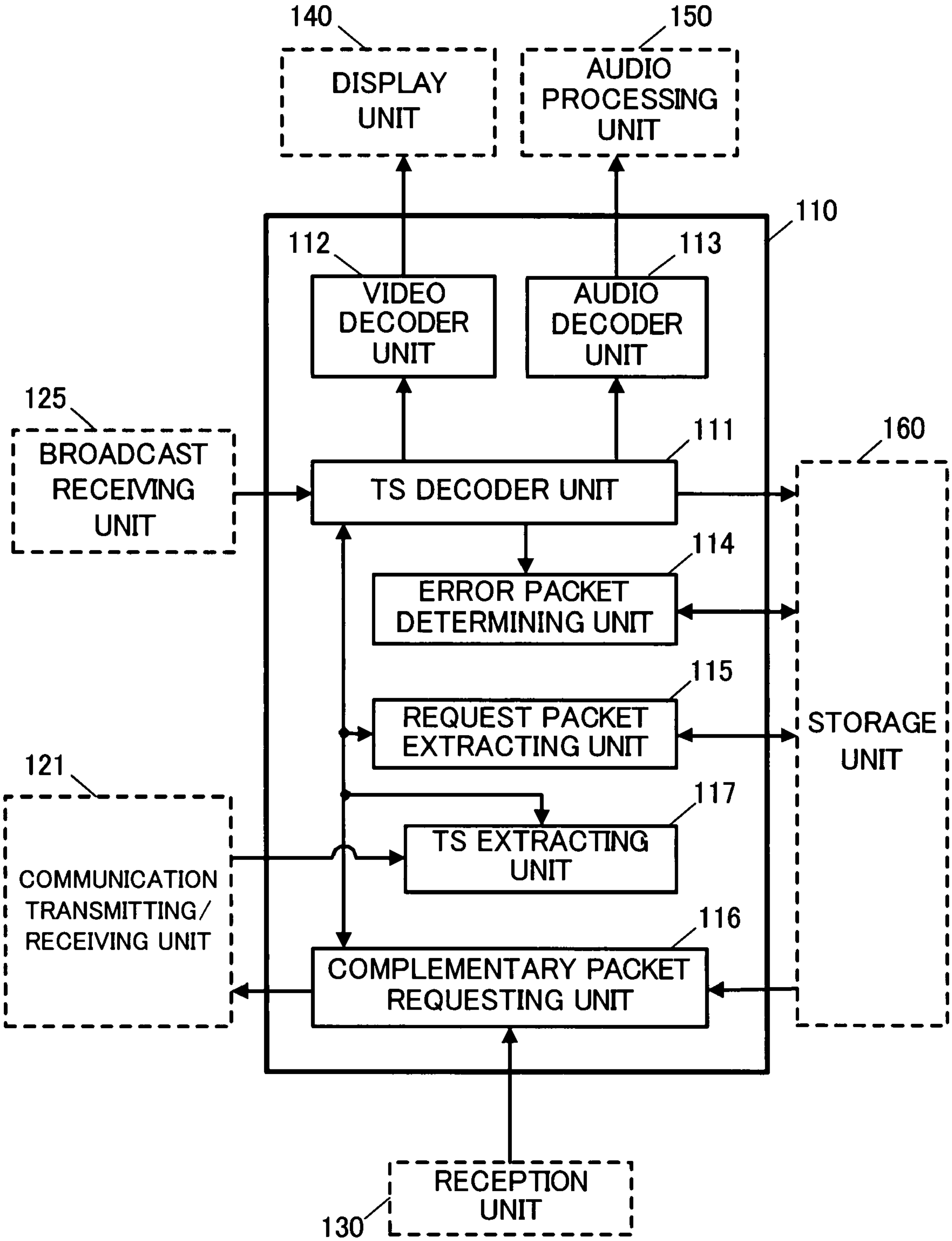
FIG. 5 is a block diagram for explaining processes performed by a control unit.

According to the present embodiment, the control unit 110 reads out a program for performing the function of each unit shown in FIG. 5 from the program storage unit 164 and executes the program. FIG. 5 is a block diagram for explaining the processes performed by the control unit 110.

As shown, the control unit 110 functions as a TS decoder unit 111, a video decoder unit 112, an audio decoder unit 113, an error packet determining unit 114, a request packet extracting unit 115, a complementary packet requesting unit 116, a TS extracting unit 117, etc.

The TS decoder unit 111 separates the TS packets 601 from one another, that are multiplexed on a transport stream 600 demodulated by the demodulating unit 128 of the broadcast receiving unit 125, and stores them in the received packet storage area 161. Further, the TS decoder unit 111 generates the received packet managing table 170 according the reception condition, and stores it in the received packet storage area 161. Furthermore, the TS decoder unit 111 restores the content data by joining the separated TS packets 601 based on the continuity counter 171, and sends the restored content data to the video decoder unit 112 or to the audio decoder unit 113 according to the type of the elements.

The video decoder unit 112 decodes video data and/or text data restored by the TS decoder unit 111, and outputs the data to the display unit 140. The display unit 140 displays the decoded video data or text data on the output device provided to the display unit 140. Video data is data that has been coded by a moving image coding method such as, for example, H.264/AVC, etc. The video decoder unit 112 performs a decoding process that corresponds to such a coding method.

The audio decoder unit 113 decodes audio data restored by the TS decoder unit 111 and outputs it to the audio processing unit 150. The audio processing unit 150 outputs the decoded audio data from the speaker 152 connected to the audio processing unit 150. Audio data is data that has been coded by an audio coding method such as, for example, AAC+SBR, etc. The audio decoder unit 113 performs a decoding process that corresponds to such a coding method.

The error packet determining unit 114 generates the error packet managing table 180 by specifying the PID and value of the continuity counter 171 of error packets based on the reception flag 172 in the received packet managing table 170 stored in the received packet storage area 161, and stores the error packet managing table 180 in the error information storage area 162.

The request packet extracting unit 115 generates the request packet managing table 190 by specifying packet groups for which a request for retransmission should be made to the distribution device 300 based on the error packet managing table 180 generated in the error information storage area 162 and the received packet managing table 170 generated in the received packet storage area 161, and stores the generated request packet managing table 190 in the request information storage area 163.

The complementary packet requesting unit 116 acquires information on a packet group for which a request is to be made, that is recorded in the request packet managing table 190 in the request information storage area 163, in response to a user instruction input from the reception unit 130. Then, by controlling the communication transmitting/receiving unit 121, the complementary packet requesting unit 116 requests the distribution device 300 through the mobile communication network 10 to retransmit the packets included in the acquired group. Here, access information (for example, an IP address, etc.) for accessing the distribution device 300 is written in, for example, the NIT 620 multiplexed on the transport stream 600 received by the broadcast receiving unit 125, or a television broadcast program table, broadcasting area information, or the like which has been obtained beforehand.

The TS extracting unit 117 acquires the transport stream 600, which the distribution device 300 has distributed in response to the request from the complementary packet requesting unit 116, from the data which the TS extracting unit 117 receives through the mobile communication network 10 by controlling the communication transmitting/receiving unit 121, and supplies the acquired transport stream 600 to the TS decoder unit 111.

According to the present embodiment, the above-described functional configuration is realized by the control unit 110 executing the program. However, these functions may be realized by a physical configuration such as, for example, an ASIC (Application Specific Integrated Circuit). Particularly, the functions of the video decoder unit 112 and/or the audio decoder unit 113 may be performed by hardware processing utilizing a circuit prepared for that purpose only. In this case, audio data decoding may be performed by the audio processing unit 150.

The above-described configuration elements are the major elements necessary for realizing the present invention with the use of the mobile communication terminal 100, and other configuration elements necessary as a mobile communication terminal are prepared as needed.

Figure 7:
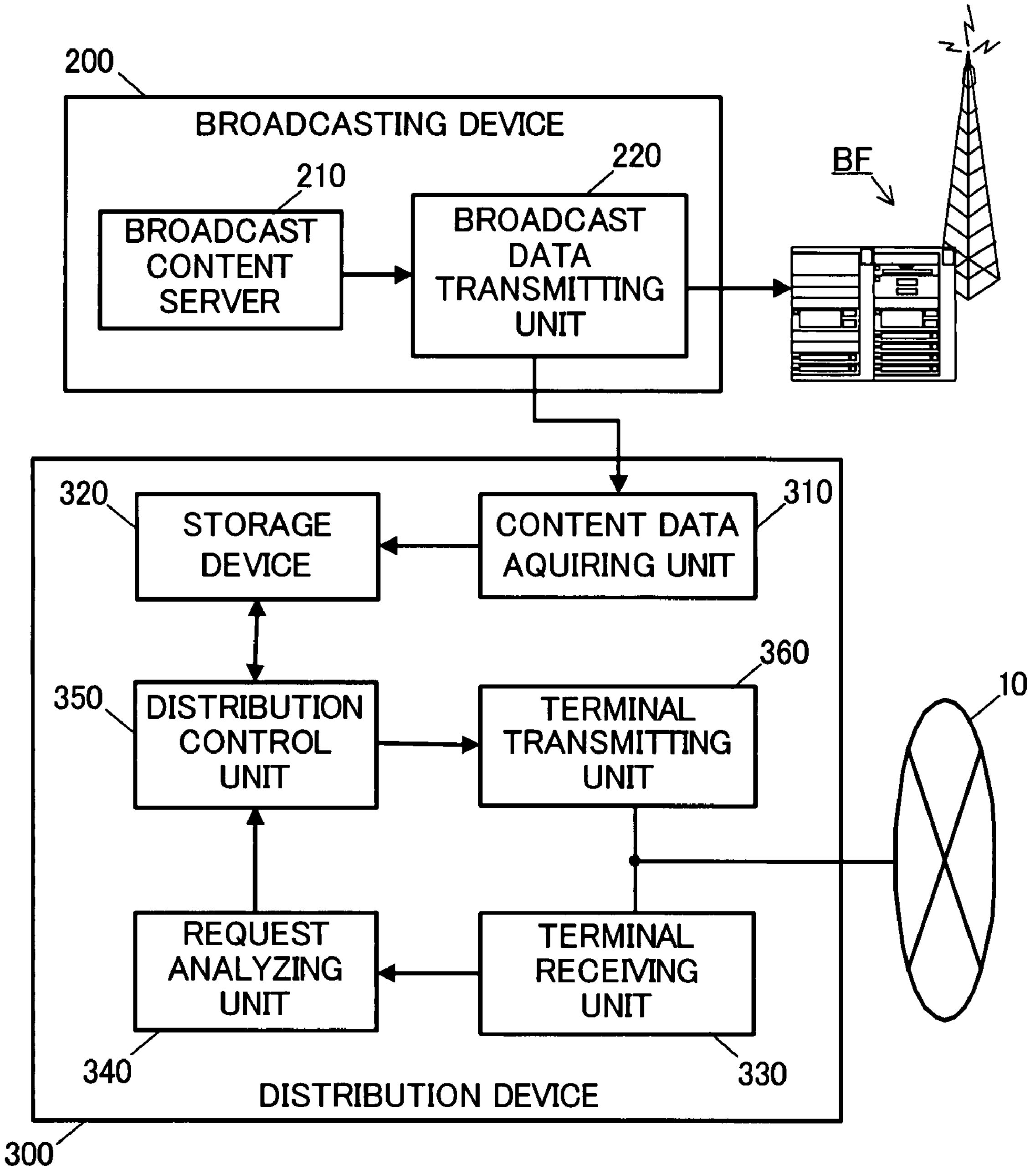
FIG. 7 is a block diagram showing the configurations of a broadcasting device and distribution device.

Next, the configurations of the broadcasting device 200 and distribution device 300 will be explained with reference to FIG. 7. As described above, the broadcasting device 200 is a device for radiating and broadcasting television airwaves that can be received by the mobile communication terminal 100, and run by a broadcasting station, or the like. As shown in FIG. 7, the broadcasting device 200 comprises a broadcast content server 210 and a broadcast data transmitting unit 220.

The broadcast content server 210 is constituted by a computer device such as, for example, a mainframe, a workstation, etc., accumulates content data of television programs to be broadcast, and sends the content data to the broadcast data transmitting unit 220 in response to a request from the broadcast data transmitting unit 220.

The broadcast data transmitting unit 220 acquires content data of a program to be broadcast by requesting it from the broadcast content server 210 based on, for example, a predetermined broadcasting schedule. The broadcast data transmitting unit 220 converts the content data sent from the broadcast content server 210 into data for digital broadcasting. According to the present embodiment, the broadcast data transmitting unit 220 multiplexes video data, audio data, and additional data which may be arbitrarily acquired, in the transport stream format to generate a transport stream 600, and forwards it to a broadcasting facility BF.

The broadcasting facility BF broadcasts a radio wave, which is obtained by modulating the transport stream 600 forwarded from the broadcast data transmitting unit 220 according to a modulation method such as, for example, OFDM (Orthogonal Frequency Division Multiplexing) modulation, etc. According to the present embodiment, the broadcasting facility BF performs digital terrestrial television broadcasting for portable terminals (so-called one-segment broadcasting) according to the ISDB-T standard. That is, the broadcasting facility BF divides a band allocated for a broadcast wave for digital terrestrial television broadcasting (for example, an HDTV (High Definition Television) broadcast wave or an SDTV (Standard Definition Television) broadcast wave) of one channel, into 13 blocks called segment, and outputs the wave at the frequency of one segment among the 13 segments.

Further, the broadcast data transmitting unit 220 is connected to the distribution device 300 through, for example, a specially-prepared network or the like, for providing the content data of the television program being broadcast, to the distribution device 300. Synchronization information such as, for example, PCR (Program Block Reference), etc., which is based on time information generated by the clock of the broadcast data transmitting unit 220, is multiplexed on the transport stream 600 generated by the broadcast data transmitting unit 220. The broadcast data transmitting unit 220 notifies the values indicated by the synchronization information multiplexed on the TS packets of the program being broadcast, to the distribution device 300 at appropriate timings.

Next, the distribution device 300 will be explained. The distribution device 300 is a device for distributing the same content data as the television program being broadcast from the broadcasting device 200, to the mobile communication terminal 100 through the mobile communication network 10. The distribution device 300 is run by the broadcasting station that runs the broadcasting device 200, or a business entity that contracts with the broadcasting station. According to the present embodiment, the distribution device 300 distribute a TS packet 601 to the mobile communication terminal 100 in response to a request therefrom, in order to complement any data that the mobile communication terminal 100 could not have received properly due to broadcast reception troubles, etc.

The configuration of the distribution device 300 will be explained with reference to FIG. 7. As shown, the distribution device 300 comprises a content data acquiring unit 310, a storage device 320, a terminal receiving unit 330, a request analyzing unit 340, a distribution control unit 350, a terminal transmitting unit 360, etc.

The content data acquiring unit 310 gains connection to the broadcast data transmitting unit 220 of the broadcasting device 200 to acquire the same content data as the television program being broadcast by the broadcasting device 200 from the broadcast data transmitting unit 220, and stores it in the storage device 320.

The storage device 320 is constituted by a storage device such as, for example, a hard disk device, a database device, etc., and stores the content data acquired by the content data acquiring unit 310.

The terminal receiving unit 330 is constituted by, for example, a communication device or the like that is connected to the mobile communication network 10, and receives, through the mobile communication network 10, a request for the retransmission of a TS packet 601 from the mobile communication terminal 100, which is receiving the broadcast from the broadcasting device 200.

The request analyzing unit 340 is constituted by, for example, a computer device or the like, and analyzes the retransmission request received by the terminal receiving unit 330 to specify the destination to which the TS packet 601 to be distributed, and the TS packet 601 to be distributed.

The distribution control unit 350 is constituted by, for example, a computer device or the like. The distribution control unit 350 acquires the content data that includes the TS packet 601 to be distributed based on the result of the analysis by the request analyzing unit 340, and controls the distribution of the TS packet 601 to the mobile communication terminal 100.

The terminal transmitting unit 360 is constituted by, for example, a communication device or the like that is connected to the mobile communication network 10, and transmits the TS packet 601 in the content data acquired by the distribution control unit 350, for which the retransmission request has been made, to the mobile communication terminal 100 that has made the transmission request, through the mobile communication network 10.

In such a configuration of the distribution device 300, the request analyzing unit 340 and the distribution control unit 350 may be constituted by a device prepared for that purpose only, or may be constituted by a general-purpose computer device. In this case, by installing and executing a program for realizing the functions of the request analyzing unit 340 and distribution control unit 350 according to the present embodiment on a general-purpose computer device, it is possible to control the general-purpose computer device to function as the request analyzing unit 340 and the distribution control unit 350.

The operation of the television reception system 1 having the above-described configuration will be explained below. First, a television broadcast receiving process performed by the mobile communication terminal 100 for receiving and watching a television broadcast will be explained with reference to a flowchart shown in FIG. 8. This television broadcast receiving process is started as triggered by an instruction that television program reception should be started, which is given with the user operating predetermined buttons or keys provided on the reception unit 130.

When this process is started, the tuner unit 127 selects any channel to start receiving a desired wave. The broadcast receiving unit 125 receives an airwave and demodulates it. The TS decoder unit 111 acquires a demodulated transport stream 600 of the television broadcast program (step S101).

The TS decoder unit 111 separates the acquired transport stream 600 into TS packets 601 (step S102). The TS decoder unit 111 generates a received packet managing table 170 as shown in FIG. 3, and stores the received packet managing table 170 and the TS packets 601 in the received packet storage area 161 (step S103). The TS decoder unit 111 sets a predetermined value ("1" according to the present embodiment) in the reception flags 172 that correspond to TS packets 601 that have been received properly.

When the received packet managing table 170 is generated, the TS decoder unit 111 notifies this to the error packet determining unit 114. In response to the notification from the TS decoder unit 111, the error packet determining unit 114 accesses the received packet storage area 161, and specifies the PID and value of the continuity counter 171 of any error packets, based on the reception flags 172 in the generated received packet managing table 170. Then, the error packet determining unit 114 generates an error packet managing table 180 as shown in FIG. 4A and stores it in the error information storage area 162 (step S104).

Since transport streams 600 are sequentially received, the TS decoder unit 111 and the error packet determining unit 114 sequentially update the received packet managing table 170 and the error packet managing table 180.

Meanwhile, the TS decoder unit 111 sequentially sends out the TS packets 601 to the video decoder unit 112 and the audio decoder unit 113. The video decoder unit 112 and the audio decoder unit 113 sequentially decode the acquired TS packets 601 (step S105). The video decoder unit 112 and the audio decoder unit 113 output the decoded signals to the display unit 140 and the audio processing unit 150 respectively. That is, the received television broadcast program is reproduced (step S106).

Figure 11:
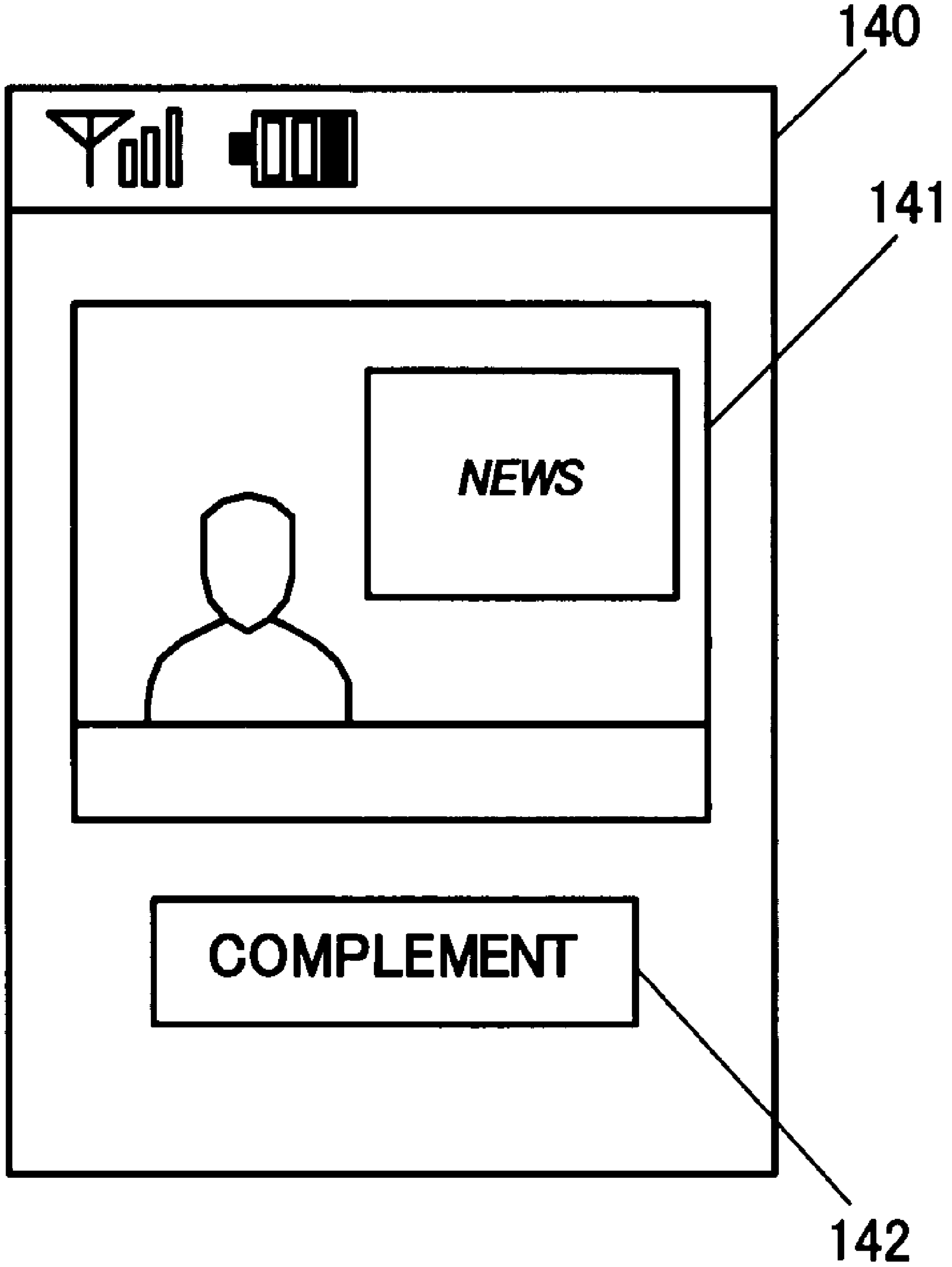
FIG. 11 is a diagram showing a display example of a television broadcast reproduction screen of the mobile communication terminal.

An example of the display on the screen on which the television broadcast is reproduced is shown in FIG. 11. As shown, on the display of the display unit 140, there are displayed a watching screen for watching the received video, etc., and a complement button 142 for requesting complementing of any TS packet 601.

In a case where any trouble (for example, discontinuation or interruption of video or audio, etc.) occurs in the video or audio reproduction while watching a television program, the user of the mobile communication terminal 100 can instruct complementary reproduction by selecting a predetermined button or key of the reception unit 130.

When the complement button 142 is depressed, an input signal representing that the complement button 142 is selected is input from the reception unit 130 to the control unit 110. Based on this input signal, the complementary packet requesting unit 116 determines whether or not complementary reproduction is requested by the user (step S107).

In a case where it is determined that complementary reproduction is not requested (step S107: NO), the control unit 110 continues receiving and reproducing the television broadcast until a predetermined finish instruction (for example, an operation of the user for finishing the television watching or for turning off the mobile communication terminal 100, etc.) is given (step S108: NO).

Figure 9:
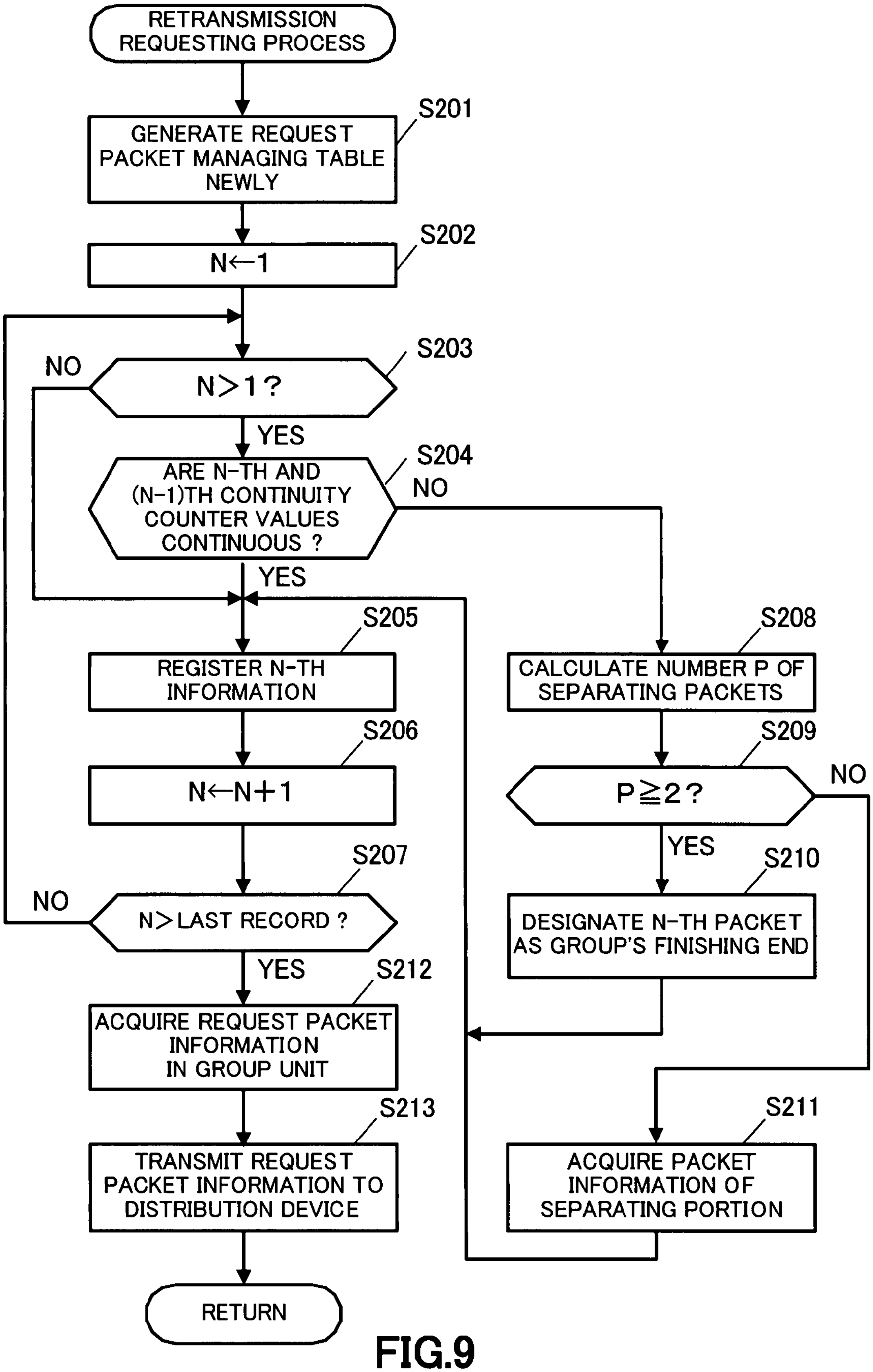
FIG. 9 is a flowchart for explaining a retransmission requesting process performed in the television broadcast receiving process.

To the contrary, in a case where it is determined that complementary reproduction is requested (step S107: YES), a process (retransmission requesting process) for requesting the distribution device 300 to retransmit packets is performed by the complementary packet requesting unit 116 (step S200). As obvious from this, according to the present embodiment, since the mobile communication terminal 100 requests retransmission of packets in response to an operation of the user, the user can instruct complementary reproduction at a desired timing. The detail of this retransmission requesting process will be explained with reference to a flowchart shown in FIG. 9.

First, the complementary packet requesting unit 116 notifies the TS decoder unit 111 that retransmission is requested. The TS decoder unit 111 acquires the synchronization information (PCR, etc.) which is multiplexed on the ES packet reproduced at the timing at which the user requests retransmission, and notifies the acquired synchronization information to the complementary packet requesting unit 116. By this operation, the TS decoder unit 111 determines the timing at which the user requests packet retransmission.

When notified of the synchronization information indicating the timing of the retransmission request, the complementary packet requesting unit 116 instructs the request packet extracting unit 115 to extract the packets for which retransmission is to be requested. In response to the instruction from the complementary packet requesting unit 116, the request packet extracting unit 115 accesses the request information storage area 163 and generates a new request packet managing table 190 (step S201).

When the request packet managing table 190 is generated, the request packet extracting unit 115 notifies this to the complementary packet requesting unit 116. Further, the request packet extracting unit 115 refers to the error packet managing table 180 and sets a counter value N, which designates any record in the error packet managing table 180, to the initial value "1" (step S202).

In a case where the counter value N does not meet N>1, i.e., in a case where N=1 is established (step S203: NO), the request packet extracting unit 115 registers the information on an error packet written at the Nth (first) record to the request packet managing table 190 generated at step S201 (step S205).

Next, the request packet extracting unit 115 increments the counter value N (+1) (step S206), and returns to step S203 unless the counter value exceeds the number of records in the error packet managing table 180 (step S207: NO). In this case, as the counter value comes to meet N>1 (step S203: YES), the request packet extracting unit 115 compares the value of the continuity counter 171 written at the Nth record with the value of the continuity counter 171 written at the (N−1)th record to determine whether or not these continuity counter values are continuous (step S204).

In a case where the values of the continuity counter 171 are continuous (step S204: YES), the request packet extracting unit 115 registers the information on the error packet written at the Nth record to the request packet managing table 190 generated at step S201 (step S205).

To the contrary, in a case where the values of the continuity counter 171 are not continuous (step S204: NO), the request packet extracting unit 115 calculates the difference between these values to derive the number P of separating packets by which the error packets are separated from each other (step S208). As described above, according to the present embodiment, in a case where the error packets are not separated from each other by two packets or more, these error packets and the normal packet sandwiched between the error packets are made up as one group. The request packet extracting unit 115 determines whether or not the number P of separating packets calculated at step S208 is 2 or larger (step S209).

In a case where the number P of separating packets by which the error packets are separated from each other is 2 or larger (step S209: YES), the request packet extracting unit 115 designates the packet written at the N-th record in the error packet managing table 180 as the finishing end packet of the group (step S210). Then, the request packet extracting unit 115 registers the information of this record to the request packet managing table 190 (step S205).

To the contrary, in a case where the number P of separating packets is smaller than 2 (step S209: NO), the request packet extracting unit 115 accesses the received packet managing table 170 in the received packet storage area 161, acquires the PID and value of continuity counter 171 of the packet (i.e., the properly received packet) that corresponds to the separating portion, and registers the PID and continuity counter value to the request packet managing table 190 (step S211).

After registering the information on the normal packet that corresponds to the separating portion, the request packet extracting unit 115 registers the information written at the N-th record of the error packet managing table 180 to the request packet managing table 190 (step S205).

In this manner, the PID and continuity counter value of each of the error packets and not more than one normal packet between the error packets that is not continuously followed by any other normal packet are registered in the request packet managing table 190. That is, the request packet extracting unit 115 determines the packets for which the retransmission request is to be made, based on the continuity of the error packets.

Then, in a case where the record indicated by the counter value N exceeds the last record in the error packet managing table 180 (step S207: YES), the request packet extracting unit 115 finishes generating the request packet managing table 190 corresponding to the broadcast presently being received, and notifies this to the complementary packet requesting unit 116.

In response to the notification from the request packet extracting unit 115, the complementary packet requesting unit 116 accesses the request information storage area 163, acquires the packet information recorded in the generated request packet managing table 190 in the group unit (step S212). The packet information acquired at this step is information which indicates the packets which the mobile communication terminal 100 is to request the distribution device 300 to retransmit.

Generally, it is after the user becomes aware that the reception condition has become poor, when he/she makes a retransmission request. Therefore, there is a possibility that the reception trouble the user has perceived occurred before the timing at which the retransmission request is made. When acquiring the packet information from the request packet managing table 190, the complementary packet requesting unit 116 specifies a group which includes a packet having synchronization information that is prior to the time indicated by the synchronization information notified from the TS decoder unit 111 by a predetermined time period, and acquires information regarding such a group and the groups thereafter from the request information storage area 163.

This predetermined time period may be a predetermined constant value, or may be a changeable value. For example, the reception unit 130 receives an instruction input for determining this predetermined time period from the user in advance, and stores information indicating the predetermined time period determined by the user in the storage unit 160. Then, the complementary packet requesting unit 116 reads out the information indicating the predetermined time period stored in the storage unit 160, and specifies the groups for which the request is to be made to the distribution device 300. By this operation, when ordering complementary reproduction, the user can watch the television broadcast that is prior by the user's desired time period or prior to the predetermined time period.

Figure 8:
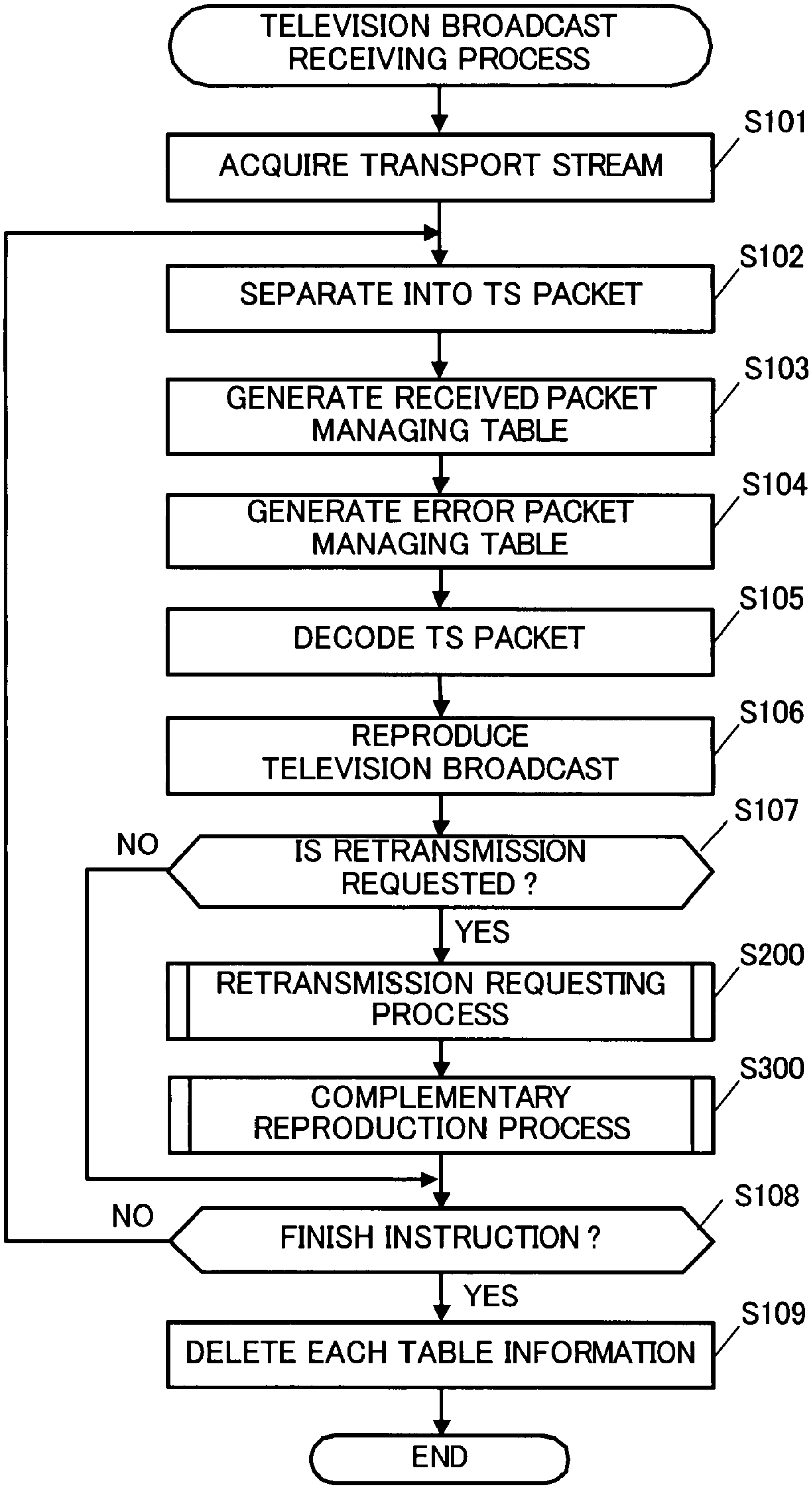
FIG. 8 is a flowchart for explaining a television broadcast receiving process according to an embodiment of the present invention.

When the packet information indicating the packets for which the retransmission request is to be made is acquired, the complementary packet requesting unit 116 controls the communication transmitting/receiving unit 121 to transmit the acquired packet information to the distribution device 300 through the mobile communication network 10 (step S213), and returns to the flow of the television broadcast receiving process shown in FIG. 8. The communication transmitting/receiving unit 121 also transmits address information (for example, the IP address, etc. of the mobile communication terminal 100) that indicates the mobile communication terminal 100 to which the distribution should be directed, to the distribution device 300.

For example, assume that a retransmission request for a TS packet 601 which is included in an i-th (i being an integer equal to or larger than 1) group is to be made. The complementary packet requesting unit 116 controls the communication transmitting/receiving unit 121 to transmit packet information that indicates the PID of all the TS packets 601 included in the i-th group to the distribution device 300. Alternatively, the complementary packet requesting unit 116 may specify the TS packet 601 for which the retransmission request is to be made, by transmitting the PID of the top TS packet 601 included in the i-th group and the number of packets included in this group.

On the other hand, in the distribution device 300, the terminal receiving unit 330 receives the packet information indicating the packets for which the retransmission request is made. The request analyzing unit 340 analyzes the received packet information and specifies the TS packets 601 for which the retransmission request is made. The distribution control unit 350 acquires the TS packets 601 for which the retransmission request is made from the storage device 320. Then, based on the address information notified from the mobile communication terminal 100, the terminal transmitting unit 360 transmits the acquired TS packets 601 to the mobile communication terminal 100. That is, the TS packets 601 that the mobile communication terminal 100 has requested are distributed to the mobile communication terminal 100 from the distribution device 300 through the mobile communication network 10.

Figure 10:
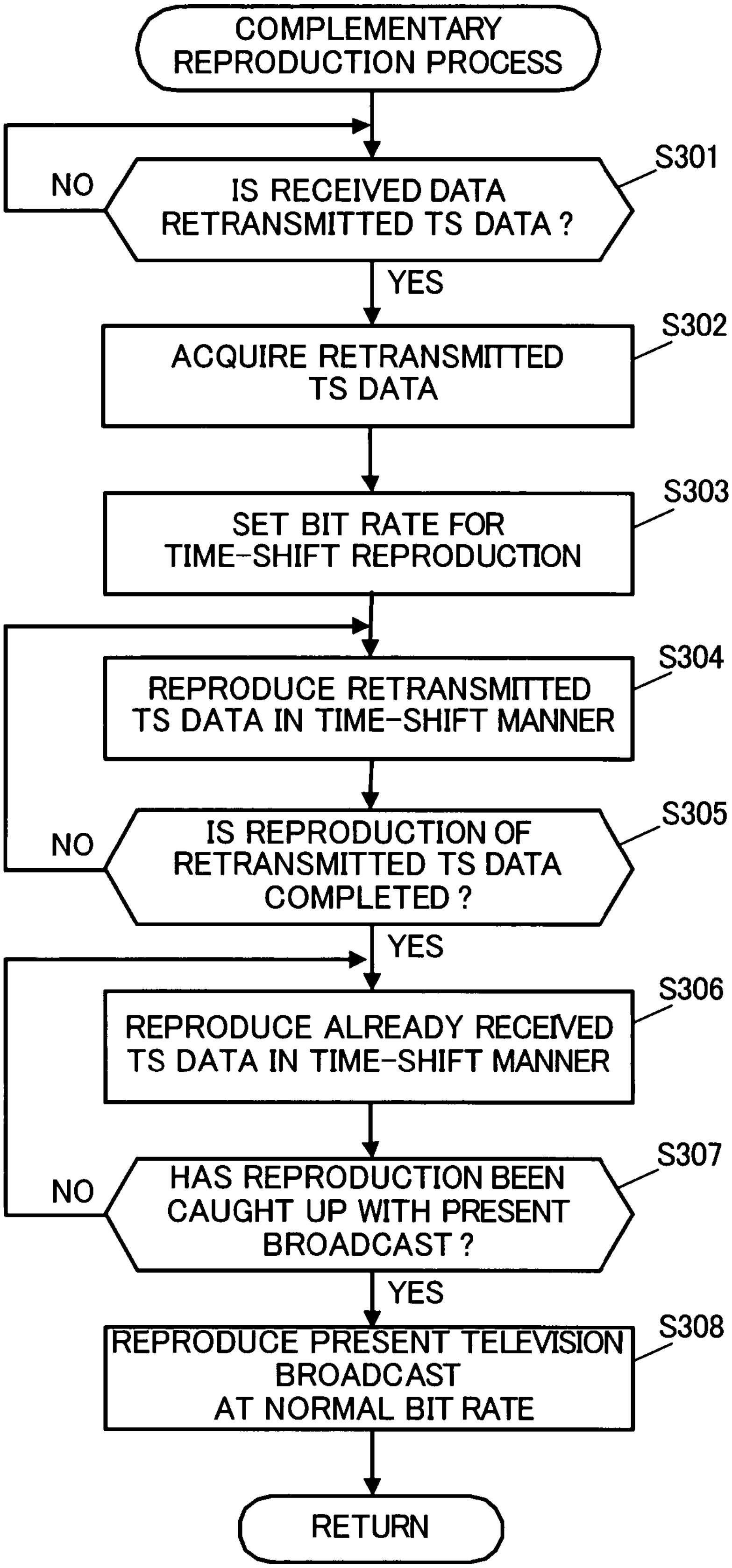
FIG. 10 is a flowchart for explaining a complementary reproduction process performed in the television broadcast receiving process.

Next, the control unit 110 performs a process (complementary reproduction process) for reproducing the transport stream 600 including the TS packets 601 distributed from the distribution device 300 (step S300). The detail of this complementary reproduction process will be explained with reference to a flowchart shown in FIG. 10. This complementary reproduction process is started as triggered by the packet information being transmitted at step S213 of the above-described retransmission requesting process.

The communication transmitting/receiving unit 121 receives various data including the TS packets 601 for which the retransmission request has been made (hereinafter referred to as "retransmitted TS data"), through the mobile communication network 10. The TS extracting unit 117 determines whether or not the received data is retransmitted TS data (step S301). In a case where the received data is retransmitted TS data (step S301: YES), the TS extracting unit 117 supplies the received retransmitted TS data sequentially to the TS decoder unit 111. The TS decoder unit 111 acquires the retransmitted TS data (step S302).

When supplied from the TS extracting unit 117 with the retransmitted TS data distributed from the distribution device 300, the TS decoder unit 111 reproduces the retransmitted TS data. The TS decoder unit 111 receives the airwaves from the broadcasting device 200 also while reproducing the retransmitted TS data, and stores the received TS packets 601 in the received packet storage area 161 of the storage unit 160. Therefore, the TS decoder unit 111 can reproduce the transport stream 600 that includes the TS packets 601 received while the retransmitted TS data is reproduced, after the reproduction of the retransmitted TS data is completed.

The TS decoder unit 111 complementarily reproduces the portion in which the trouble has occurred in reproducing, by reproducing the retransmitted TS data from the distribution device 300 in a manner so-called "time-shift". The complementary reproduction is done at a higher reproduction speed than the normal, and when the television broadcast presently being broadcast is caught up with, the present television broadcast is reproduced on time at the normal reproduction speed. The TS decoder unit 111 sets the bit rate, which is the reproduction speed in the complementary reproduction (time-shift reproduction) of the retransmitted TS data (step S303).

The TS decoder unit 111 sets the bit rate of the complementary reproduction (time-shift reproduction), based on the data length of the retransmitted TS data, the present time at which the real-time television broadcast is reproduced, etc. Note that since a clean display cannot be obtained if the reproduction speed is too high, it is preferred that the TS decoder 111 set a bit rate that is as high as not to make the user feel any sense of strangeness.

The TS decoder unit 111 reproduces the retransmitted TS data supplied from the TS extracting unit 117, i.e., the transport stream 600 including the TS packets 601 retransmitted from the distribution device 300 at the bit rate set at step S303 (step S304). The TS decoder unit 111 switches from the on-time reproduction of the television broadcast from the broadcasting device 200 to the reproduction of the retransmitted TS data distributed from the distribution device 300.

Then, when the reproduction of the retransmitted TS data is completed (step S305: YES), the TS decoder unit 111 accesses the received packet storage area 161 to acquire the synchronization information of the transport stream 600 of the television broadcast which the broadcast receiving unit 125 is continually receiving. Further, the TS decoder unit 111 specifies a TS packet 601 that has the same time information as the synchronization information of the last packet in the retransmitted TS data, and reproduces the transport stream data (hereinafter referred to as "already received broadcast TS data") that starts from the specified TS packet 601 stored in the storage unit 160, in the time-shift manner at the bit rate set at step S303 (step S306).

That is, even after the complementary reproduction (time-shift reproduction) of the retransmitted TS data is completed, the real-time broadcast now being broadcast advances further by a time taken for reproducing the retransmitted TS data pulse a time required for reproducing the already received broadcast TS data. Therefore, the TS decoder unit 111 reproduces the already received broadcast TS data that has been received in parallel with the complementary reproduction of the retransmitted TS data and stored in the received packet storage area 161, in the time-shift manner at the reproduction speed (bit rate) higher than the normal speed.

The TS decoder unit 111 reproduces the already received broadcast TS data that is stored in the received packet storage area 161 in the time-shift manner, and compares at appropriate timings the synchronization information of the already received broadcast TS data with the synchronization information of the transport stream 600 of the television broadcast now being received thereby to determine whether or not the real-time broadcast has been caught up with (step S307).

In a case where it is determined that the reproduction of the already received broadcast TS data has not caught up with the broadcasting by the broadcasting device 200 (step S307: NO), the TS decoder unit 111 continues reproducing the already received broadcast TS data until the real-time broadcasting by the broadcasting device 200 is caught up with. In a case where it is determined that the reproduction of the already received broadcast TS data catches up with the real-time broadcasting by the broadcasting device 200 (step S307: YES), the TS decoder unit 111 reproduces the transport stream 600 of the television broadcast received at that timing at the normal bit rate (step S308). That is, the TS decoder unit 111 switches from the time-shift reproduction of the broadcast program already received and stored in the storage unit 160 to the on-time reproduction of the television program now being broadcast, and returns to the flow of the television broadcast receiving process shown in FIG. 8.

In the television broadcast receiving process, the reception and reproduction of the television broadcast are continued according to the above-described process until, for example, the user gives a predetermined finish instruction (step S108: NO). Then, when a finish instruction is given (step S108: YES), the TS decoder unit 111 deletes the information stored in the received packet managing table 170 in the received packet storage area 161, the error packet managing table 180 in the error information storage area 162, and the request packet managing table 190 in the request information storage area 163 (step S109), and terminates the process.

As explained above, according to the present embodiment, the mobile communication terminal 100 determines any error packet in the transport stream 600 received in the television broadcast, and requests the distribution device 300 to retransmit the TS packets 601 included in the group that includes the corresponding error packet when the user gives an instruction for complementary reproduction. The mobile communication terminal 100 classifies the received packets into groups and requests the retransmission of the packets in the group unit. In a case where a predetermined condition is satisfied, the mobile communication terminal 100 requests the retransmission of also a properly received packet, together with the packet that has not received properly. That is, since the mobile communication terminal 100 does not make a retransmission request in the block unit or for only the error packet unlike conventionally, but determines the packets for which a retransmission request is to be made based on the continuity of the error packet, the communication efficiency is fine. Further, since the distribution device 300 can distribute the packets by flexibly determining the packets to be distributed in response to the request, it is possible to suppress communication traffic jam. The mobile communication terminal 100 and the distribution device 300 can reduce the occasions for the data transmission and reception that accompany the complementary reproduction. Therefore, the mobile communication terminal 100 can efficiently perform complementary reproduction. The user can watch the television broadcast with a fine image quality and a fine audio quality.

Further, the mobile communication terminal 100 reproduces the retransmitted content data in the time-shift manner at a reproduction speed that is higher than the normal. Furthermore, after the time-shift reproduction of the retransmitted content data is completed, the mobile communication terminal 100 reproduces the content data that has been received during the time-shift reproduction, at a speed higher than the normal until the real-time broadcast is caught up with. Accordingly, the user can watch the portion that cannot be received or received in a poor condition. Eventually, the user will be able to watch the television broadcast on time.

Embodiment 2

In the above-described embodiment 1, the error packet determination is performed based on the continuity counter 171 of the ES packets. That is, the mobile communication terminal 100 determines that a given packet is an error packet (a packet that has not been received), in a case where there is any packet that has not been received. Other than such an omission of a packet, there might occur an error of any data in a received packet being omitted in the bit unit. Accordingly, not only the determination of any error packet based on the continuity counter 171 shown in the embodiment 1, but also error packet determination in any other method may be performed.

According to the OFDM modulation adopted in the digital terrestrial television broadcasting (the so-called "one-segment broadcasting") for portable terminals under the ISDB-T standard, it is possible to enable a receiving device to correct any error packet, by multiplexing an error correcting code such as, for example, Reed Solomon code, convolution code, etc. With the use of such an error correcting code, any error packet may be specified. For example, when the broadcast receiving unit 125 of the mobile communication terminal 100 demodulates a received radio wave, it can decode the error correcting code and perform the process for correcting the error packet.

FIG. 12 is an example of the configuration of the received packet managing table 170, used for determining any error packet (a packet that includes a bit that has not been received properly) based on an error correcting code. As shown, records are generated in the packet receiving order in the received packet managing table 170, and an error flag 173, which indicates presence/absence of an error in each packet, is recorded. This error flag 173 is binary data of, for example, "0" and "1", and "1" is set for a packet that includes an error while "0" is set for a normal packet.

The TS decoder unit 111 may set the error flag 173 based on an error correcting code, or may set the error flag 173 based on a packet error rate (PER), etc. That is, the error packet determining unit 114 may calculate the PER of each packet in a predetermined method, and the TS decoder unit 111 may set the error flag 173 for a given packet in a case where the calculated PER is higher than a predetermined threshold.

The TS decoder unit 111 can generate the above-described error packet managing table 180, by extracting the information of those records for which the error flag 173 is set to "1".

That is, regardless of the method of determining error packets, the mobile communication terminal 100 can perform efficient complementary reproduction likewise in the above-described embodiment 1.

As explained above, with the application of the present invention in such a manner as the embodiment described so far, even in a case where the reception condition of the television broadcast is not fine, the user can watch the television broadcast with a fine image quality and a fine audio quality, by the mobile communication terminal 100 performing the complementary reproduction efficiently.

Embodiment 3

In the above-described embodiments, the TS decoder unit 111 performs complementary reproduction of content data in a case where an instruction for complementary reproduction is given from the user. However, the complementary reproduction may be started regardless of an instruction from the user.

Figure 13:
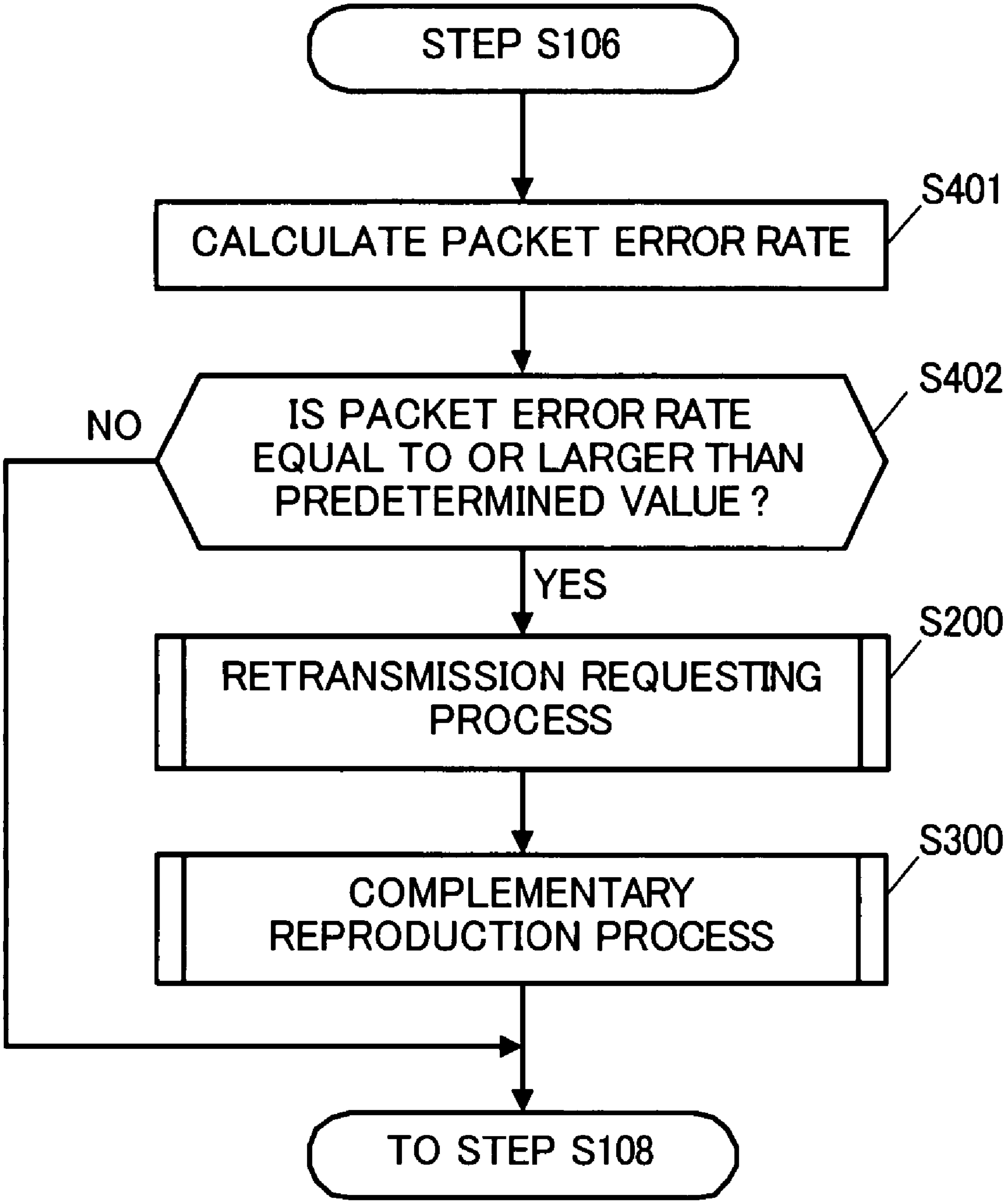
FIG. 13 is a flowchart for explaining a television broadcast receiving process according to embodiment 3.

FIG. 13 shows a flowchart of a television broadcast receiving process according to the present embodiment. Explanation for steps S101 to S106, and step S108 and thereafter will be omitted, since these steps are the same as those in the embodiment of the television broadcast receiving process shown in FIG. 8.

When the television broadcast is reproduced at step S106, the TS decoder unit 111 calculates the packet error rate of the TS packets 601 making up the transport stream 600 now being reproduced (step S401). For example, the TS decoder unit 111 calculates the packet error rate of the TS packets making up the transport stream 600 that have been received by the broadcast receiving unit 125 until a predetermined time, which is before the present time by a predetermined time period.

In a case where the calculated packet error rate is equal to or larger than a predetermined threshold (step S402; YES), the control unit 110 performs the retransmission requesting process (step S200) and the complementary reproduction process (step S300) likewise in the above-described embodiment. To the contrary, in a case where the calculated packet error rate is smaller than the predetermined threshold (step S402; NO), the control unit 110 performs the processes at step S108 and thereafter, which have been described above.

According to the present embodiment, the TS decoder unit 111 can determine whether or not to perform complementary reproduction, not in accordance with an instruction from the user. Therefore, the mobile communication terminal 100 can automatically start complementary reproduction.

Embodiment 4

The TS decoder unit 111 may also start complementary reproduction based on both an instruction input from the user and the packet error rate.

Figure 14:
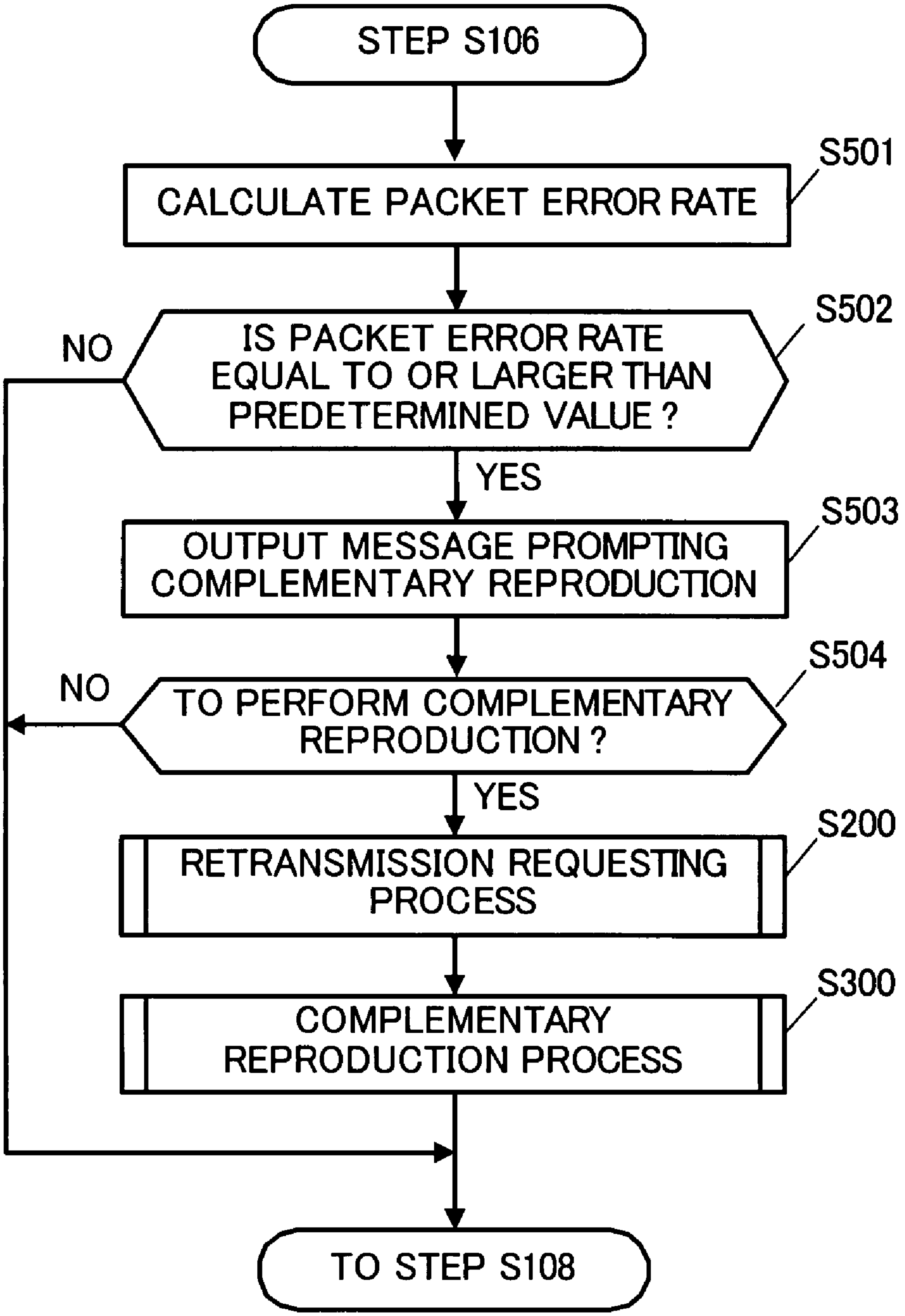
FIG. 14 is a flowchart for explaining a television broadcast receiving process according to embodiment 4.

FIG. 14 shows a flowchart of the television broadcast receiving process according to the present embodiment. Explanation for steps S101 to S106, and step S108 and thereafter will be omitted, since these steps are the same as those in the embodiment of the television broadcast receiving process shown in FIG. 8.

When the television broadcast is reproduced at step S106, the TS decoder unit 111 calculates the packet error rate of the TS packets 601 that make up the transport stream 600 now being reproduced (step S501).

Figure 15A:
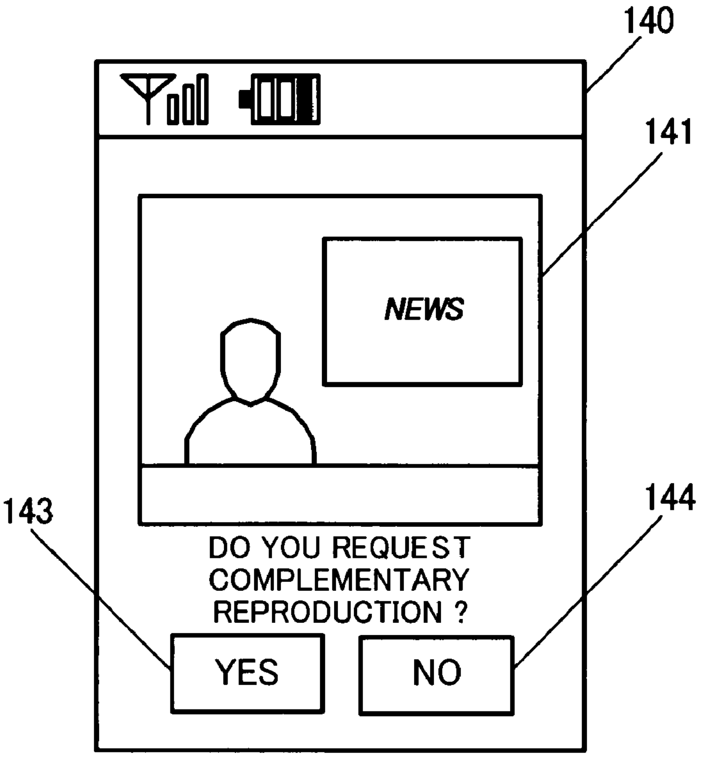
FIGS. 15A and 15B are diagrams showing display examples of a television broadcast reproduction screen.
Figure 15B:
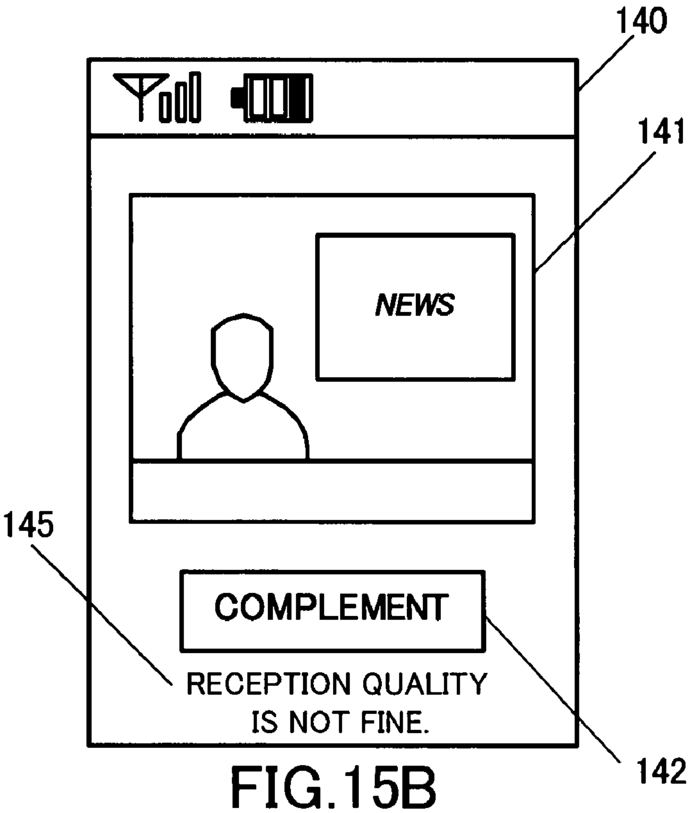

In a case where the calculated packet error rate is smaller than a predetermined threshold (step S502; NO), the TS decoder unit 111 performs the processes at step S108 and thereafter, which are described above. To the contrary, in a case where the calculated packet error rate is equal to or larger than the predetermined threshold (step S502; YES), the display unit 140 outputs a message which suggests complementary reproduction to the user, under the control of the control unit 110 (step S503). For example, in a case where a packet error rate in a predetermined time period is equal to or larger than the predetermined threshold, the display unit 140 displays a message for prompting complementary reproduction such as "Do you request complementary reproduction? (YES/NO)", etc. and a button 143 for instructing that complementary reproduction should be performed and a button 144 for instructing that complementary reproduction should not be performed, on the display device, as shown in FIG. 15A. Alternatively, under the control of the control unit 110, the display unit 140 may display a message 145 notifying that the reception quality is not fine, as shown in FIG. 15B.

The complementary packet requesting unit 116 determines whether or not complementary reproduction should be performed (step S504). For example, this determination is based on which of the buttons 143 and 144 of FIG. 15A is depressed. Or, for example, the determination is based on whether or not the complement button 142 of FIG. 15B is depressed.

In a case where it is determined that complementary reproduction should be performed (step S504; YES), the control unit 110 performs the retransmission requesting process (step S200) and the complementary reproduction process (step S300) described above. To the contrary, in a case where it is determined that complementary reproduction should not be performed (step S504; NO), the TS decoder unit 111 performs the processes at step S108 and thereafter described above.

According to the present embodiment, the complementary packet requesting unit 116 can determine whether or not complementary reproduction should be performed, based on the reception quality. Therefore, the mobile communication terminal 100 can notify to the user that complementary reproduction had better be performed.

Embodiment 5

Further, the display unit 140 may display the complement button 142 on the display in a case where a packet error rate in a predetermined time period is equal to or larger than a predetermined threshold, and may not display the complement button 142 otherwise.

Figure 16:
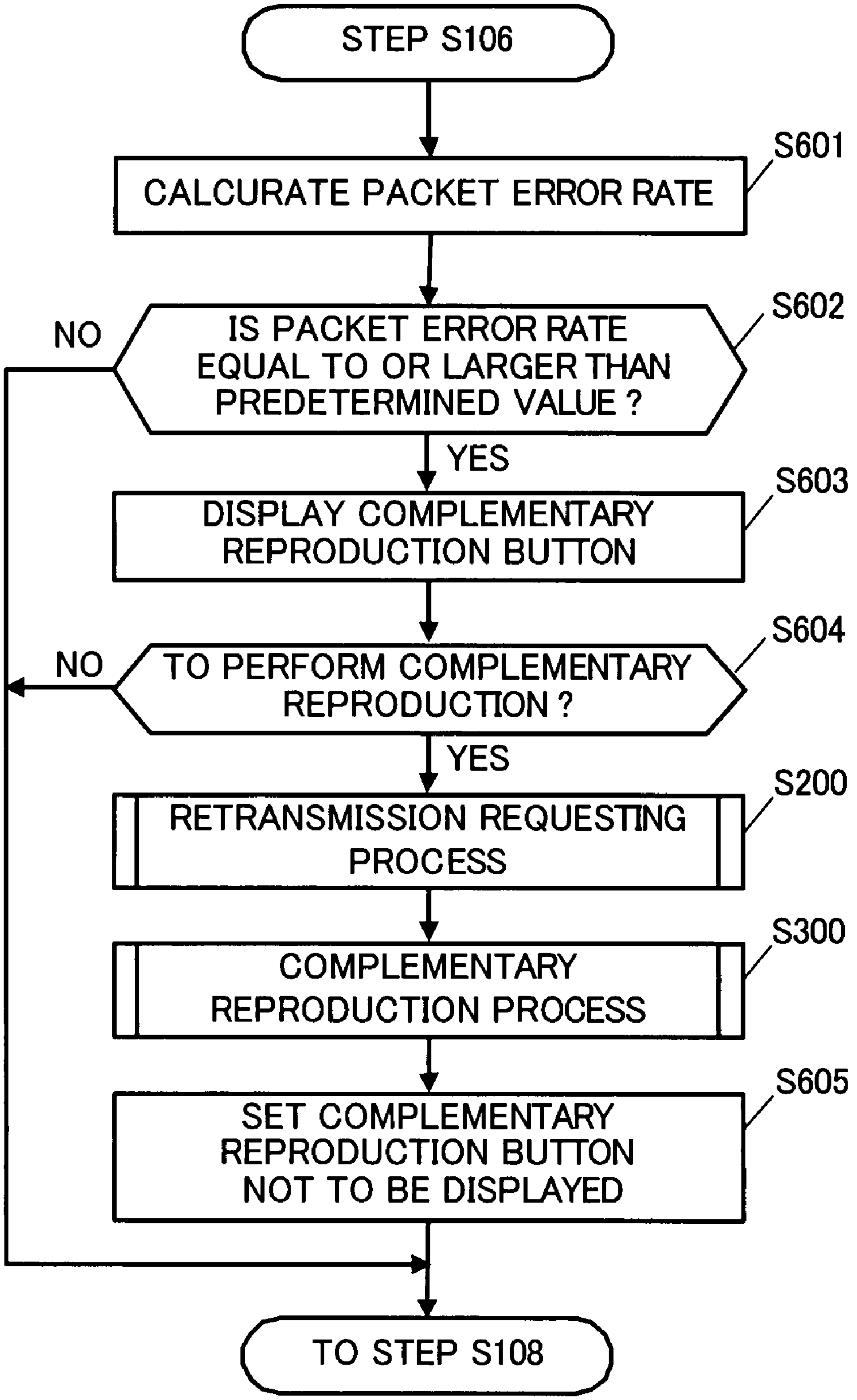
FIG. 16 is a flowchart for explaining a television broadcast receiving process according to embodiment 5.

FIG. 16 shows a flowchart of a television broadcast receiving process according to the present embodiment. Explanation for steps S101 to S106, and step S108 and thereafter will be omitted, since these steps are the same as those in the embodiment of the television broadcast receiving process shown in FIG. 8.

When the television broadcast is reproduced at step S1106, the TS decoder unit 111 calculates the packet error rate of the TS packets 601 that make up the transport stream 600 now being reproduced (step S601).

In a case where the calculated packet error rate is smaller than a predetermined threshold (step S602; NO), the TS decoder unit 111 performs the processes at step S108 and thereafter, which are described above. To the contrary, in a case where the calculated packet error rate is equal to or larger than the predetermined threshold (step S602; YES), the display unit 140 displays the complement button 142 under the control of the control unit 110 (step S603). The complementary packet requesting unit 116 determines whether or not complementary reproduction should be performed, based on whether the complement button 142 is depressed or not (step S604).

In a case where complementary reproduction should be performed (step S604; YES), the control unit 110 performs the retransmission requesting process (step S200) and the complementary reproduction process (step S300) which are described above. Further, under the control of the control unit 110, the display unit 140 sets the complement button 142 so as not to be displayed (step S605). To the contrary, in a case where it is determined that complementary reproduction should not be performed (step S604; NO), the TS decoder unit 111 performs the processes at step S108 and thereafter, which are described above.

According to the present embodiment, the complementary packet requesting unit 116 can be arranged to receive an instruction input for complementary reproduction in a case where the packet error rate is equal to or larger than the predetermined threshold, and not to receive one otherwise. Therefore, it becomes possible to prevent an erroneous operation by the user and to receive an instruction for complementary reproduction at an appropriate timing.

The above-described embodiments are mere examples, and the scope of the application of the present invention is not limited to these embodiments. That is, various applications are available and modifications of such applications are also included in the scope of the present invention.

For example, the number P of separating packets, which is determined in setting the group of packets for which a retransmission request is to be made to the distribution device 300, is an example, and can be arbitrarily changed.

Further, according to the above-described embodiments, the mobile communication terminal 100 requests the distribution device 300 to distribute packets, in a case where an instruction for requesting retransmission is given by the user. However, the mobile communication terminal 100 may determine the reception condition based on the intensity of the electric field applied in receiving the television broadcast, etc., and may request the retransmission in a case where it is determined that the reception condition is not fine.

Further, according to the above-described embodiment, the TS decoder unit 111 reproduces the retransmitted TS data acquired from the distribution device 300 and the already received broadcast TS data stored in the storage unit 160 at a bit rate higher than the normal. However, as long as the user does not mind delay from the actual broadcasting, the TS decoder unit 111 may reproduce both or one of them at the normal bit rate. That is, the TS decoder unit 111 may reproduce the transport stream 600 at a constant bit rate. Therefore, the user can watch the television broadcast program without feeling any sense of strangeness due to the reproduction speed being accelerated.

For example, the reproduction may be switched to the on-time reproduction of the television broadcast when the reception unit 130 receives an instruction for switching to the on-time reproduction of the television broadcast from the user, after the TS decoder unit 111 completes the complementary reproduction of the retransmitted TS data received from the distribution device 300. This enables the user to return to the on-time reproduction of the television broadcast at a desired timing.

The TS decoder unit 111 may perform reproduction by arbitrarily changing the bit rate.

According to the above-described embodiment, three tables, namely the received packet managing table 170, the error packet managing table 180, and the request packet managing table 190 are used. These tables may be combined or part of them may be omitted. For example, by determining whether or not a TS packet 601 of the transport stream 600 is an error packet instead of setting the reception flag 172 each time a TS packet 601 is received, or alternatively by performing this determination at the same time of setting the reception flag 172, the TS decoder unit 111 may store the determination result in the received packet managing table 170. This makes it possible to omit the error packet managing table 180.

Needless to say, a mobile communication terminal 100 which is pre-equipped with the functions of the respective units described above may be prepared, or an existing communication terminal which is not equipped with these functions can be made to function as the mobile communication terminal 100 of the present invention. In this case, a CPU or the like of a computer for controlling a communication terminal having at least the television broadcast receiving function may be caused to execute a program for controlling the CPU to function as the respective units described above.

The manner in which such a program is applied is arbitrary, and such a program can be applied to an arbitrary device if, for example, the program is provided through a communication medium such as the Internet. Other than this, the program may be stored on a predetermined recording medium (for example, a memory card, a CD-ROM, a DVD, etc.) and distributed in this form.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-080540 filed on Mar. 23, 2006 and including specification, claims, drawings and summary. The disclosure of the above Japanese Patent Application is incorporated herein by reference in its entirety.

What is claimed is:

1. A mobile communication terminal, comprising:

a broadcast receiving unit which receives stream data of a television broadcast program;

an error packet detecting unit which detects errors in packets that make up the stream data received by the broadcast receiving unit;

an error packet requesting unit which requests a distribution device which is connected to the error packet requesting unit via a network to distribute one or a plurality of packets and, based on information included in each said packet and indicating an order of reproducing each packet, requests the distribution device to:

upon determination that an order of reproducing error packets detected by the error packet detecting unit is continuous, distribute the detected error packets;

upon determination that the order of reproducing the error packets detected by the error packet detecting unit is not continuous and that a number of packets between the detected error packets is smaller than a predetermined number, distribute the detected error packets and a packet between the detected error packets in which an error is not detected; and upon determination that the order of reproducing the error packets detected by the error packet detecting unit is not continuous and that the number of packets between the detected error packet is not smaller than the predetermined number, distribute the detected error packets;

a request packet receiving unit which receives the packet requested by the error packet requesting unit, from the distribution device; and a reproducing unit which reproduces at least one of the stream data received by the broadcast receiving unit and stream data including the packet received by the request packet receiving unit.

2. The mobile communication terminal according to claim 1, wherein the error packet requesting unit requests the distribution device to distribute the packet, in response to an operation of a user of the mobile communication terminal.

3. The mobile communication terminal according to claim 2, wherein the error packet requesting unit requests the distribution device to distribute a packet, which has been received by the broadcast receiving unit at a time which is before a timing at which the operation of the user is given by a predetermined time period.

4. The mobile communication terminal according to claim 1, wherein the reproducing unit reproduces the stream data including the packet received by the request packet receiving unit, at a speed higher than a normal reproduction speed for the stream data received by the broadcast receiving unit.

5. The mobile communication terminal according to claim 4, further comprising a storage unit which stores the stream data received by the broadcast receiving unit, wherein the broadcast receiving unit receives the stream data of the television broadcast program and stores the received stream data in the storage unit, while the reproducing unit reproduces the stream data including the packet received by the request packet receiving unit.

6. The mobile communication terminal according to claim 5, wherein after completing reproducing the stream data including the packet received by the request packet receiving unit, the reproducing unit reproduces the stream data stored in the storage unit at the speed higher than the normal reproduction speed.

7. The mobile communication terminal according to claim 6, wherein the reproducing unit determines whether or not the reproducing of the stream data stored in the storage unit has caught up with a television broadcast presently being broadcast, and in a case where it is determined that the reproducing of the stream data stored in the storage unit has caught up with the television broadcast presently being broadcast, reproduces stream data of the television broadcast presently being broadcast and received by the broadcast receiving unit.

8. The mobile communication terminal according to claim 6, further comprising a reception unit which receives an instruction that the reproducing of the stream data stored in the storage unit should be ended from a user, wherein in a case where the reception unit receives an instruction that the reproducing of the stream data stored in the storage unit should be ended, after the reproducing of the stream data including the packet received by the request packet receiving unit is completed, the reproducing unit reproduces stream data of a television broadcast presently being broadcast.

9. The mobile communication terminal according to claim 1, wherein in a case where a packet error rate of a packet making up the stream data received by the broadcast receiving unit is equal to or larger than a predetermined threshold, the error packet requesting unit requests the distribution device to distribute the packet.

10. The mobile communication terminal according to claim 1, wherein in a case where a packet error rate of a packet making up the stream data received by the broadcast receiving unit is equal to or larger than a predetermined threshold, the error packet requesting unit gives the user a notification, which prompts the user to instruct reception of the packet by the request packet receiving unit.

11. The mobile communication terminal according to claim 1, wherein in a case where a packet error rate of a packet making up the stream data received by the broadcast receiving unit is equal to or larger than a predetermined threshold, the error packet requesting unit receives an instruction input indicating whether or not to request the distribution device to distribute the packet, from a user.

12. The mobile communication terminal according to claim 11, wherein in a case where the packet error rate is smaller than the predetermined threshold, the error packet requesting unit refrains from receiving the instruction input from the user.

13. A mobile communication method, comprising:

a broadcast receiving step of receiving stream data of a television broadcast program;

an error packet detecting step of detecting errors in packets making up the stream data received in the broadcast receiving step;

an error packet requesting step of requesting via a network a distribution device to distribute one or a plurality of packets and based on information included in each said packet and indicating an order of reproducing each packet, requesting the distribution device to:

upon determination that an order of reproducing error packets detected by the error packet detecting unit is continuous, distribute the detected error packets;

upon determination that the order of reproducing the error packets detected by the error packet detecting unit is not continuous and that a number of packets between the detected error packets is smaller than a predetermined number, distribute the detected error packets and a packet between the detected error packets in which an error is not detected; and upon determination that the order of reproducing the error packets detected by the error packet detecting unit is not continuous and that the number of packets between the detected error packet is not smaller than the predetermined number, distribute the detected error packets;

a request packet receiving step of receiving the packet requested from the distribution device in the error packet requesting step; and a reproducing step of reproducing at least one of the stream data received at the first receiving step and stream data including the packet received at the second receiving step.

14. A computer-readable information non-transitory recording medium storing a program for controlling a computer to function as:

a broadcast receiving unit which receives stream data of a television broadcast program;

an error packet detecting unit which detects an error in each packet making up the stream data received by the broadcast receiving unit;

an error packet requesting unit which requests a distribution device which is connected to the error packet requesting unit via a network to distribute one or a plurality of packets and, based on information included in each packet and indicating an order of reproducing each packet, requests the distribution device to:

upon determination that an order of reproducing error packets detected by the error packet detecting unit is continuous, distribute the detected error packets;

upon determination that the order of reproducing the error packets detected by the error packet detecting unit is not continuous and that a number of packets between the detected error packets is smaller than a predetermined number, distribute the detected error packets and a packet between the detected error packets in which an error is not detected; and upon determination that the order of reproducing the error packets detected by the error packet detecting unit is not continuous and that the number of packets between the detected error packet is not smaller than the predetermined number, distribute the detected error packets;

a request packet receiving unit which receives the packet requested by the error packet requesting unit, from the distribution device; and a reproducing unit which reproduces at least one of the stream data received by the broadcast receiving unit and stream data including the packet received by the request packet receiving unit.

15. The mobile communication terminal according to claim 1, wherein the error packet detecting unit and the error packet requesting unit are a single unit.

16. The computer-readable information non-transitory recording medium according to claim 14, wherein the error packet detecting unit and the error packet requesting unit are a single unit.

* * * * *